United States Patent [19]

Vanderjagt

[11] Patent Number: 4,826,083
[45] Date of Patent: May 2, 1989

[54] DIRECT INJECTION FLUID SPRAYER

[76] Inventor: John A. Vanderjagt, 1395 Glen Oaks Dr., Memphis, Tenn. 38119

[21] Appl. No.: 96,621

[22] Filed: Sep. 14, 1987

Related U.S. Application Data

[63] Continuation-in-part of Ser. No. 939,679, Dec. 8, 1986, abandoned.

[51] Int. Cl.$^4$ ............ B05B 9/06; B05B 1/20; A62C 16/30; A62C 11/02
[52] U.S. Cl. ................... 239/157; 239/168; 239/155; 239/307; 239/308; 239/310; 239/333
[58] Field of Search ............ 239/149, 155–157, 239/168, 307, 308, 310, 333

[56] References Cited

U.S. PATENT DOCUMENTS

| | | | |
|---|---|---|---|
| 828,175 | 8/1906 | Aspinwall | 239/157 X |
| 988,079 | 3/1911 | Chester | 239/157 X |
| 1,557,412 | 10/1925 | Broadway | 239/149 X |
| 3,233,832 | 2/1966 | Hallberg | 239/155 |
| 3,301,487 | 1/1967 | Young | 239/155 X |
| 3,792,814 | 2/1974 | Platz | 239/149 |
| 4,358,054 | 11/1982 | Ehrat | 239/155 |
| 4,630,773 | 12/1986 | Ortlip | 239/155 X |
| 4,650,124 | 3/1987 | Connaughty et al. | 239/157 X |
| 4,714,196 | 12/1987 | McEachern et al. | 239/308 X |

Primary Examiner—Andres Kashnikow
Assistant Examiner—Patrick N. Burkhart
Attorney, Agent, or Firm—Walker & McKenzie

[57] ABSTRACT

A direct injection chemical sprayer for spraying a fluid mixture onto a field as the sprayer is moved over the field. The sprayer includes a chemical pump mechanism for pumping chemicals from a chemical tank, a sensing mechanism for sensing the speed at which the sprayer is being moved over the field, and a drive mechanism operatively coupled to the sensing mechanism and to the chemical pump for varying the output of the chemical pump mechanism in proportion to the speed at which the sprayer is being moved over the field. A second embodiment includes self-contained replaceable cartridges each of which has a tank, a pump, drive mechanism therefor, and calibration apparatus. There are removable intermediate gear boxes and a main gear box, each of which has a plurality of selectable drive mechanisms for driving the pump of the gear box at a selected speed. A third embodiment includes a detachable frame for removably mounting on a tractor and a hydraulic drive mechanism including a master drive mechanism and a slave drive mechanism for driving the input shaft of the main gear box.

12 Claims, 16 Drawing Sheets

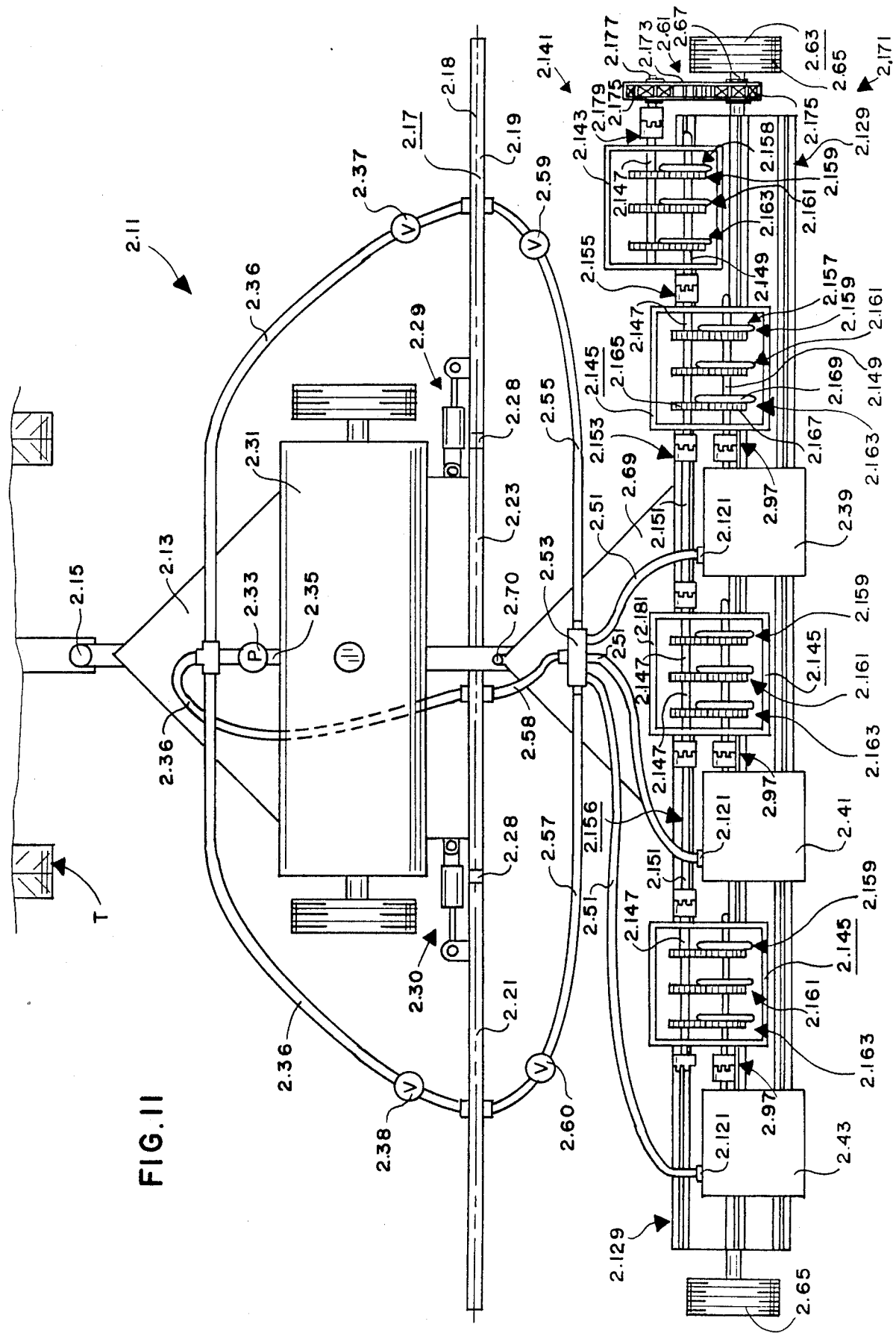

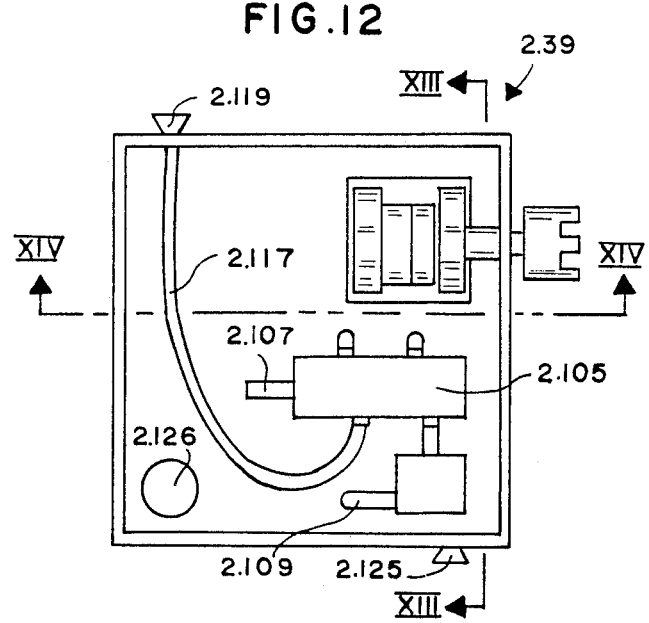
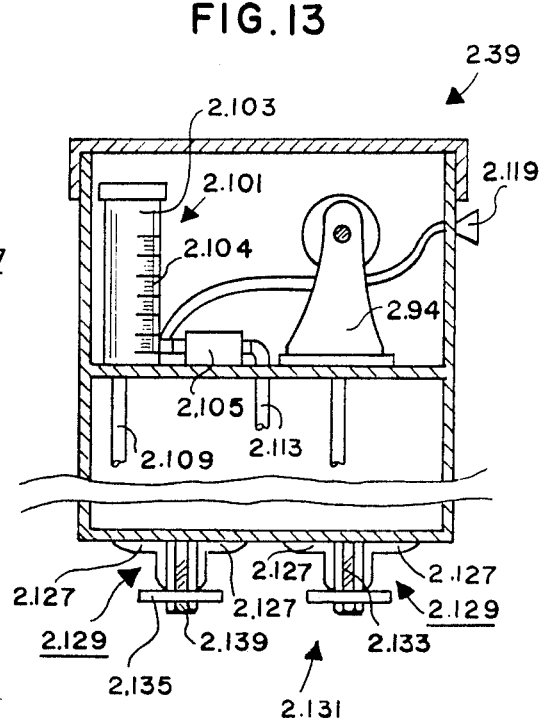
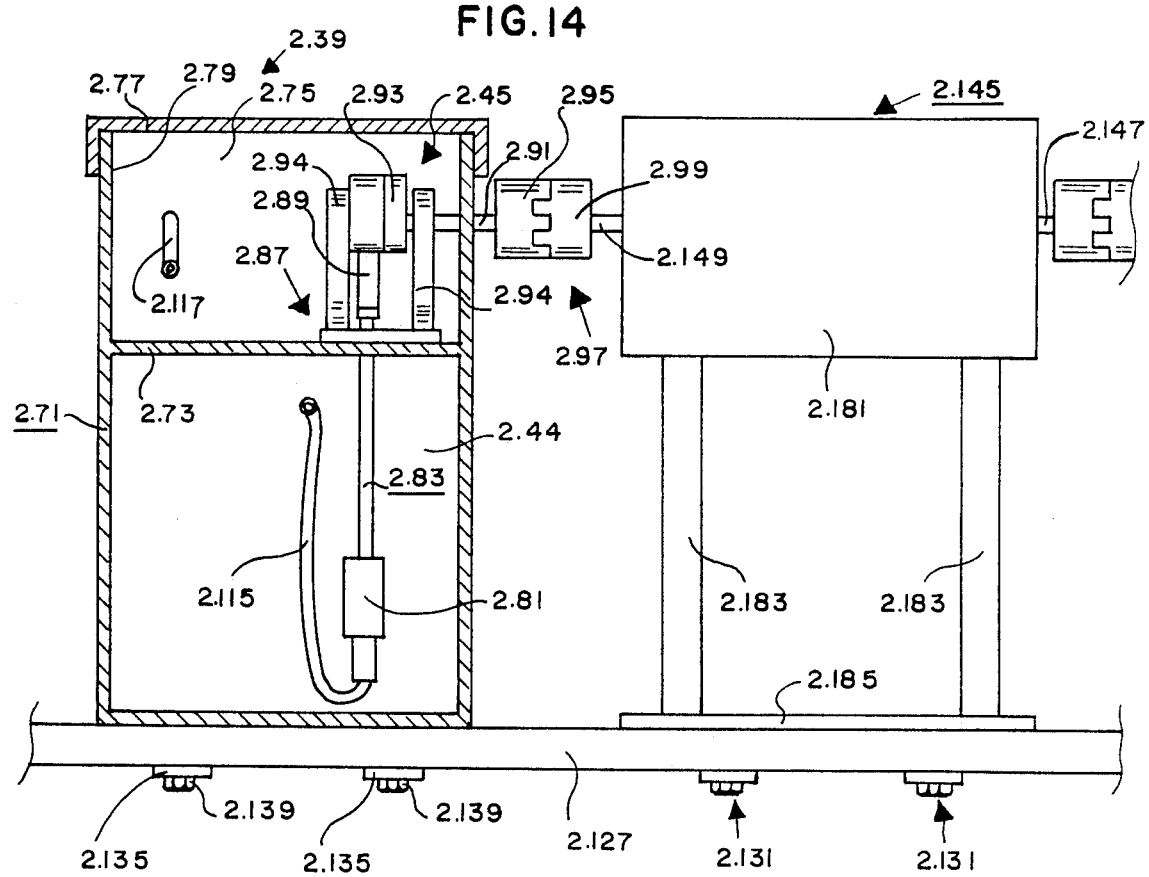

DIRECT INJECTION FLUID SPRAYER

CROSS-REFERENCE TO RELATED APPLICATION

This is a continuation-in-part of my application. Ser. No. 06/939,679, filed Dec. 8, 1986, now abandoned entitled "Direct Injection Fluid Sprayer."

BACKGROUND OF THE INVENTION

1. Field of the Invention

The present invention relates, in general, to sprayers for spraying a fluid mixture onto a field as he sprayer moves over the field.

2. Description of the Related Art

Various sprayers have been heretofore developed for being pulled by tractors, or the like, over fields to spray water/chemical mixes onto the field to fertilize or weed the field, etc. Such prior art sprayers may include an elongated primary manifold member for being positioned behind the tractor transverse to the direction of movement of the tractor, a plurality of spray nozzles attached to the manifold member, a water tank holding a quantity of water, a water pump means for pumping water from the water tank to the manifold member and out the spray nozzles, a chemical tank, and a chemical tank pump means for pumping chemicals from the chemical tank to the suction side of the water pump means and out the spray nozzles with the water. Such prior art sprayers do not disclose or suggest the present invention.

SUMMARY OF THE INVENTION

The present invention is directed toward providing an improved direct injection fluid sprayer for spraying a fluid mixture as the sprayer is moved over the field to be sprayed.

One objective of the present invention is to provide a direct injection sprayer for chemicals and the like in which the chemicals can be applied at various rates without ever having to touch the chemicals.

Another objective of the present invention is to provide such a sprayer with which the chemicals can be applied in the right proportions at all times regardless of the speed of the sprayer.

Another objective of the present invention is to be able to switch chemicals right in the field without any spillage or cleaning of pumps and tanks.

Another objective of the present invention is to be able to discharge the chemical right at the nozzle so that lead or lag time would be practically eliminated.

Another objective of the present invention is to have a means of increasing and/or decreasing the rate (plus or minus 30%) so that the heavy infested areas of certain fields can be sprayed with an extra dose or doses and for the lesser infected parts the dosage can be reduced.

Another objective of the present invention is to have a means of applying one, two or three chemicals at the same time.

Another objective of the present invention is to totally eliminate tank mixes and rinse aids.

Another objective of the present invention is to be able to calibrate in a closed environment and never need the chemical to leave the system to calibrate.

Another objective of the present invention is to provide means for the chemicals to be handled in a cartridge type container which has the pump calibration chamber and dry couplings for filling all in one unit.

Another objective of the present invention is to provide a direct injection fluid sprayer for pumping chemicals from the chemical tank or tanks directly to the primary manifold member rather than indirectly through the suction side of the water pump to thereby reduce the lag time, etc., between the time it is first desired to spray a chemical mixture and the time the chemical mixture is sprayed from the spray nozzles.

Another objective of the present invention is to provide a direct injection fluid sprayer in which the output thereof is proportional to the speed at which the sprayer is moving.

Another objective of the present invention is to provide a direct injection fluid sprayer in which there are self-contained cartridges that can be easily removed or installed and each of which includes its own tank, pump and calibration system that is a closed system eliminating the possibility of cross-contamination with the chemicals in the other cartridges and providing a system that is extremely versatile.

Another objective of the present invention is to provide removable intermediate gear boxes and a main gear box, each of which has a plurality of selectable drive mechanisms for driving the pump of the gear box at a selected speed.

Another objective of the present invention is to provide a detachable sprayer adapted to be mounted on a vehicle for converting the vehicle into an improved sprayer for spraying chemicals onto a field.

Another objective of the present invention is to provide improved means for hydraulically driving a first shaft in unison with a second shaft.

Another objective is to generally improve the design and construction of chemical sprayers.

BRIEF DESCRIPTION OF THE DRAWINGS

FIG. 11 is a somewhat diagrammatic top plan view of a second embodiment of the direct injection sprayer of the present invention.

FIG. 12 is a somewhat diagrammatic top plan view of one of the cartridges of the sprayer of FIG. 11 with the top and other portions thereof omitted for clarity.

FIG. 13 is a sectional view substantially as taken on line XIII—XIII of FIG. 12 and with the to thereof shown in place.

FIG. 14 is a sectional view substantially as taken on line XIV—XIV of FIG. 12 and with one of the drive assemblies of the sprayer of FIG. 11 engaged therewith.

DESCRIPTION OF THE PREFERRED EMBODIMENT

Figure 1:
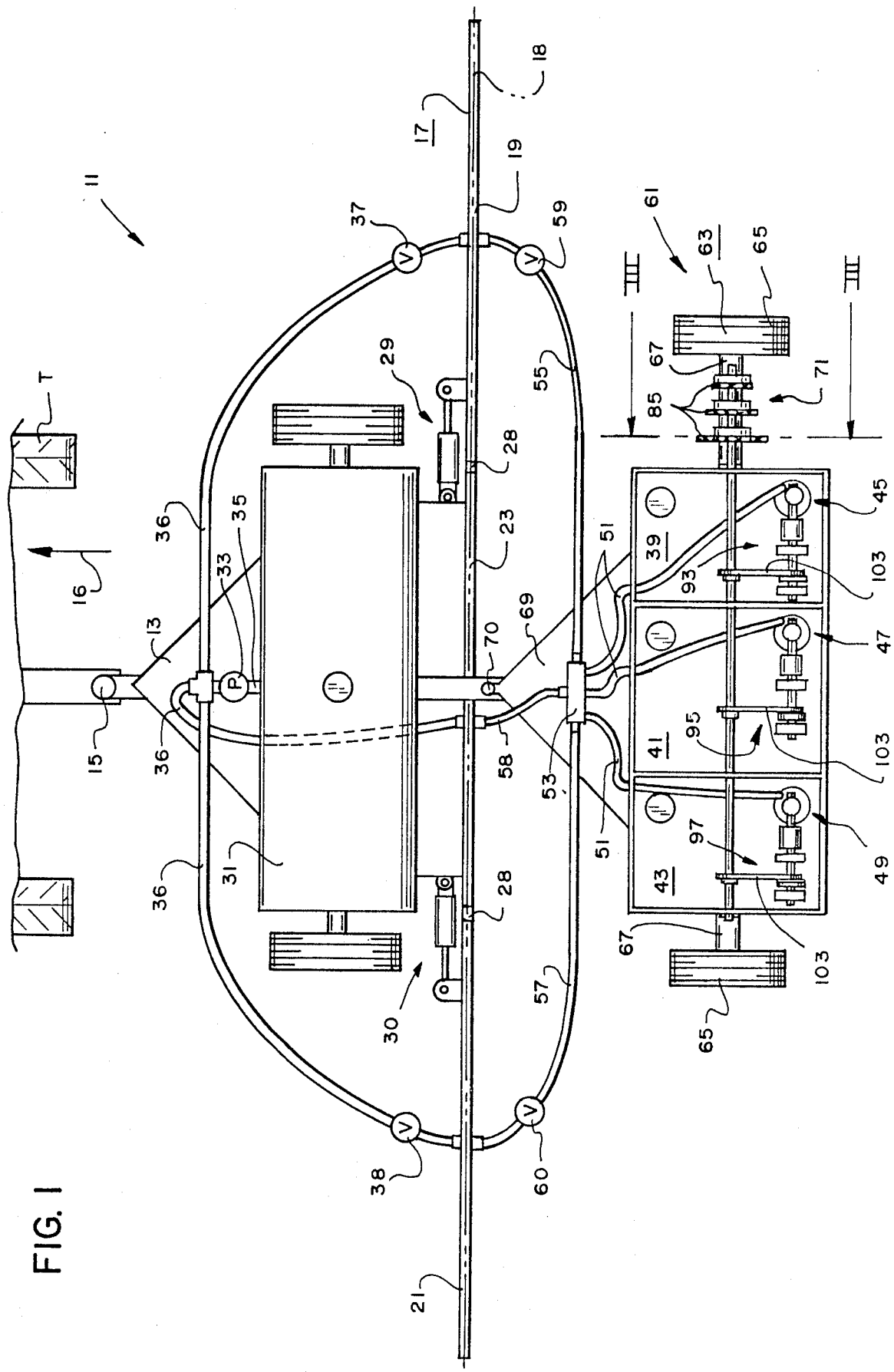
FIG. 1 is a somewhat diagrammatic top plan view of a first embodiment of the direct injection sprayer of the present invention.

The direct injection fluid sprayer of the present invention consists of means for spraying fluid mixture onto a field as the sprayer is moved over the field.

A first embodiment of the fluid sprayer of the present invention is shown in FIGS. 1-10 and identified by the numeral 11. The sprayer 11 may be of the type for being pulled by a typical agricultural tractor T, or the like, over the field with the fluid mixture being sprayed onto the field to fertilize or weed the field, etc. The sprayer 11 preferably includes a frame 13 having a hitch means 15 located at the front thereof for allowing the frame 13 to be removably coupled to the tractor T (see FIGS. 1 and 2) to allow the sprayer 11 to be pulled over the field by the tractor T generally in the direction as indicated by the arrow 16 in FIGS. 1 and 2 as will now be apparent to those skilled in the art.

The sprayer 11 includes an elongated manifold means 17 coupled to the frame 13 in a manner so that the longitudinal axis 18 of the manifold means 17 is located transverse to the general direction of travel of the sprayer 11 as indicated by the arrow 16 (see, in general, FIG. 1). The manifold means 17 preferably includes an elongated right manifold member 19, an elongated left manifold member 21, and an elongated middle manifold member 23. Each manifold member 19, 21, 23 includes a hollow interior for receiving the fluid mixture to be sprayed onto the field. A plurality of spaced spray nozzles 27 are mounted on each manifold member 19, 21, 23 in communication with the interiors thereof for allowing a fluid mixture to be sprayed therethrough from the interiors thereof. Hinge means 28 are preferably provided for hingeably joining the right and left manifold members 19, 21 to the right and left ends respectively of the middle manifold member 23 in a manner which allows the right and left manifold members 19, 21 to be moved between a down or in-use position for spraying the fluid mixture onto the field and an up or out-of-use position. The sprayer 11 preferably includes a first piston means 29 for selectively moving the right manifold member 19 between the down or in-use position and the up or out-of-use position and preferably includes a second piston means 30 for selectively moving the left manifold member 21 between the down or in-use position and the up or out-of-use position. The specific construction of the manifold member 17 may vary as will be apparent to those skilled in the art.

Figure 2:
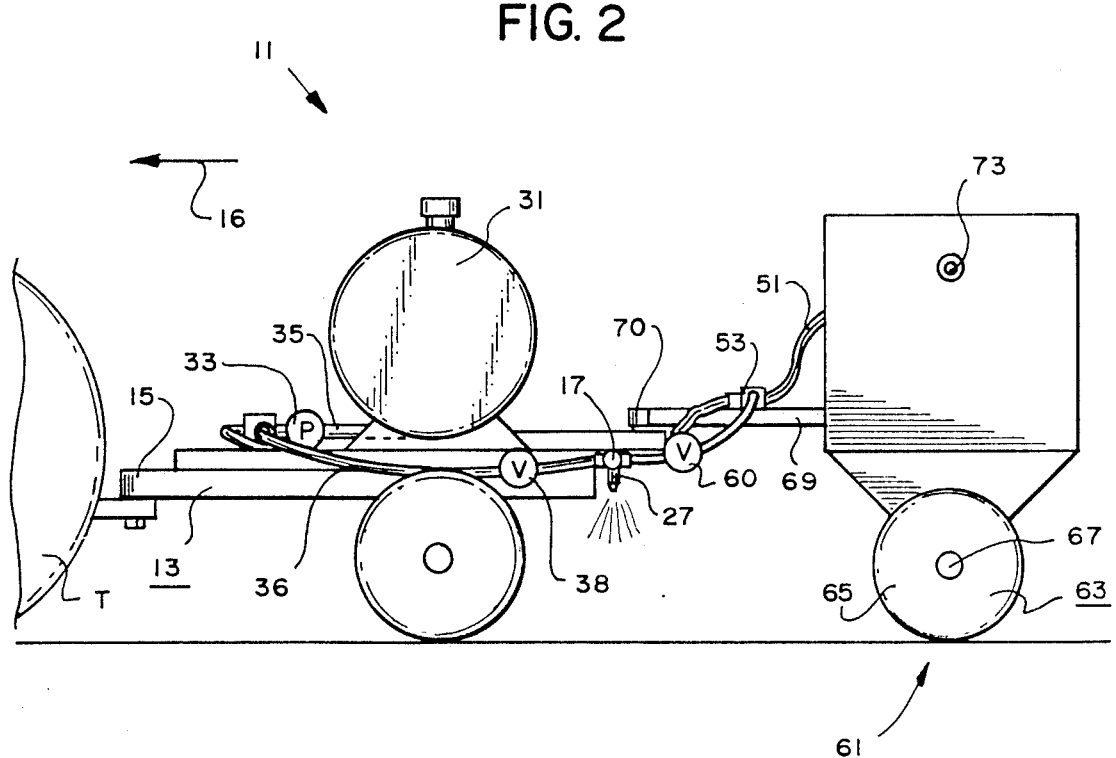
FIG. 2 is a side elevational view of the sprayer of FIG. 1.

The sprayer 11 includes a water tank 31 for holding a quantity of water to be sprayed (see FIGS. 1 and 2). The water tank 31 is secured to the frame 13 and may be of any typical construction well known to those skilled in the art.

The sprayer 11 includes a water pump means 33 operatively coupled to the manifold means 17 and to the water tank 31 for selectively pumping water from the water tank 31 to the manifold means 17 and out the spray nozzles 27 (see FIGS. 1 and 2). The water pump means 33 may be of any typical construction and operation well known to those skilled in the art. An inlet conduit 35 may extend from the interior of the water tank 31 to the inlet port of the water pump means 33, and one or more outlet conduits 36 may extend from the outlet port or ports of the water pump means 33 to a particular place in the interior of the manifold means 17 (see, in general, FIG. 1). Typical electrical circuitry, and the like, may be provided to control the operation of the pump means 33 in the typical manner well known to those skilled in the art.

The sprayer 11 preferably includes a first valve means 37 for selectively controlling the flow of fluid through the conduit 36 from the pump means 33 to the right manifold member 19 and preferably includes a second valve means 38 for selectively controlling the flow of fluid through the conduit 36 from the pump means 33 to the left manifold member 21.

The sprayer 11 includes at least one and preferably a first chemical tank 39 for holding a quantity of a first chemical to be sprayed from the nozzles 27 with the water, a second chemical tank 41 for holding a quantity of a second chemical to be sprayed from the nozzles 27 with the water, and a third chemical tank 43 for holding a quantity of a third chemical to be sprayed from the nozzles 27 with the water (see, in general, FIG. 1).

The sprayer 11 includes at least one and preferably a first chemical pump means 45 operatively coupled to the manifold means 17 and the first chemical tank 39 for selectively pumping chemicals from the first chemical tank 39 to the manifold means 17 and out the nozzles 27 with the water, a second chemical pump means 47 operatively coupled to the manifold means 17 and the second chemical tank 41 for selectively pumping chemicals from the second chemical tank 41 to the manifold means 17 and out the nozzles 27 with the water, and a third chemical pump means 49 operatively coupled to the manifold means 17 and the third chemical tank 43 for selectively pumping chemicals from the third chemical tank 43 to the manifold means 17 and out the nozzles 27 with the water (see, in general, FIG. 1). The specific construction and operation of the pump means 45, 47, 49 will hereinafter be described.

An outlet conduit 51 preferably extends from the outlet port of each pump means 45, 47, 49 to an intermediate manifold member 53 (see FIGS. 1 and 2). A first outlet conduit 55 preferably extends from the intermediate manifold member 53 to a place in the right manifold member 19 adjacent the place where water enters into the manifold member 19 through one of the conduits 36 for allowing a quantity of chemical to pass from the intermediate manifold member 53 to the right manifold member 19 (see FIG. 1). A second outlet conduit 57 preferably extends from the intermediate manifold member 53 to a place in the left manifold member 21 adjacent the place where water enters into the manifold member 21 through one of the conduits 36 for allowing a quantity of chemical to pass from the intermediate manifold member 53 to the left manifold member 21 (see FIG. 1). A third outlet conduit 58 preferably extends from the intermediate manifold member 53 to a place in the middle manifold member 23 adjacent the place where water enters into the manifold member 23 through one of the conduits 36 for allowing a quantity of chemical to pass from the intermediate manifold member 53 to the middle manifold member 23 (see FIG. 1). The sprayer 11 preferably includes a third valve means 59 for selectively controlling the flow of fluid through the first outlet conduit 55 from the intermediate manifold member 53 to the right manifold member 19 and preferably includes a fourth valve means 60 for selectively controlling the flow of fluid through the second outlet conduit 57 from the intermediate manifold member 53 to the left manifold member 21.

It will be understood from the foregoing that by having the chemicals entering the manifold member 17 at places in the manifold member adjacent the places where the water enters into the manifold member and where the chemicals are mixed with the water, the portion of the system that is contaminated with the chemical/water mixture is reduced so that the amount of flushing needed when chemicals are changed is also reduced.

The sprayer 11 includes sensing means 61 for sensing the speed at which the sprayer is moving over the field (see FIGS. 1-4). The sensing means 61 preferably includes a ground-engaging wheel means 63 for engaging the ground as the sprayer 11 is moved over the field. The ground-engaging wheel means 63 preferably includes at least one and preferably a spaced pair of ground-engaging wheels 65 for being rotated by the ground as the sprayer 11 is moved over the field and includes a ground-engaging wheel shaft 67 for being rotated by the ground-engaging wheels 65 as the sprayer 11 is moved over the field at a speed proportional to the speed at which the sprayer 11 is being moved over the field.

Figure 3:
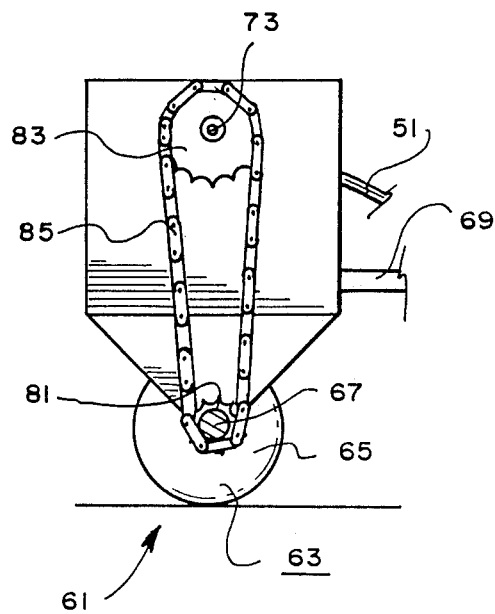
FIG. 3 is a sectional view substantially as taken on line III—III of FIG. 1.
Figure 4:
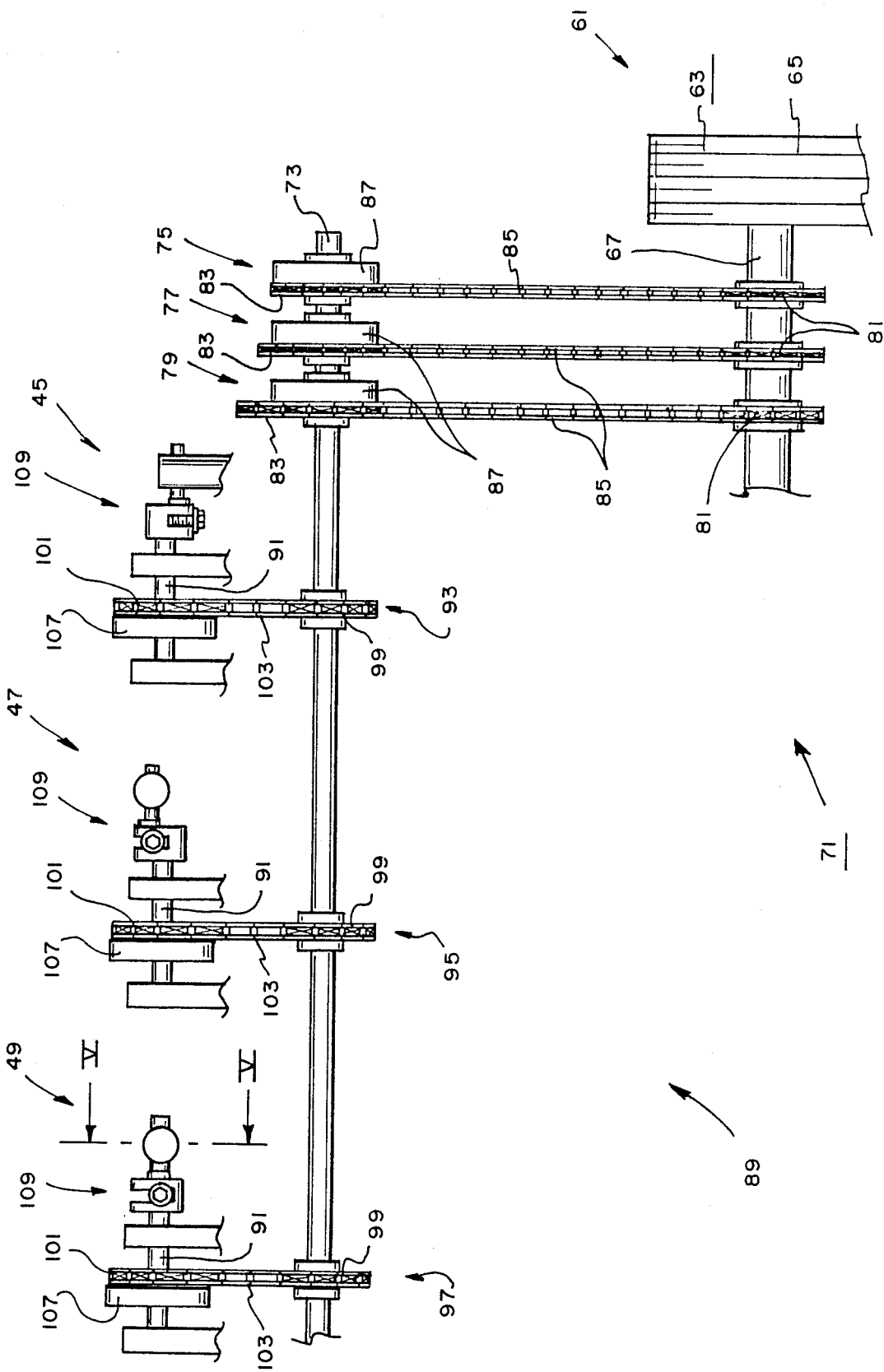
FIG. 4 is a diagrammatic view of certain components of the drive mechanism of the sprayer of FIG. 1.
Figure 5:
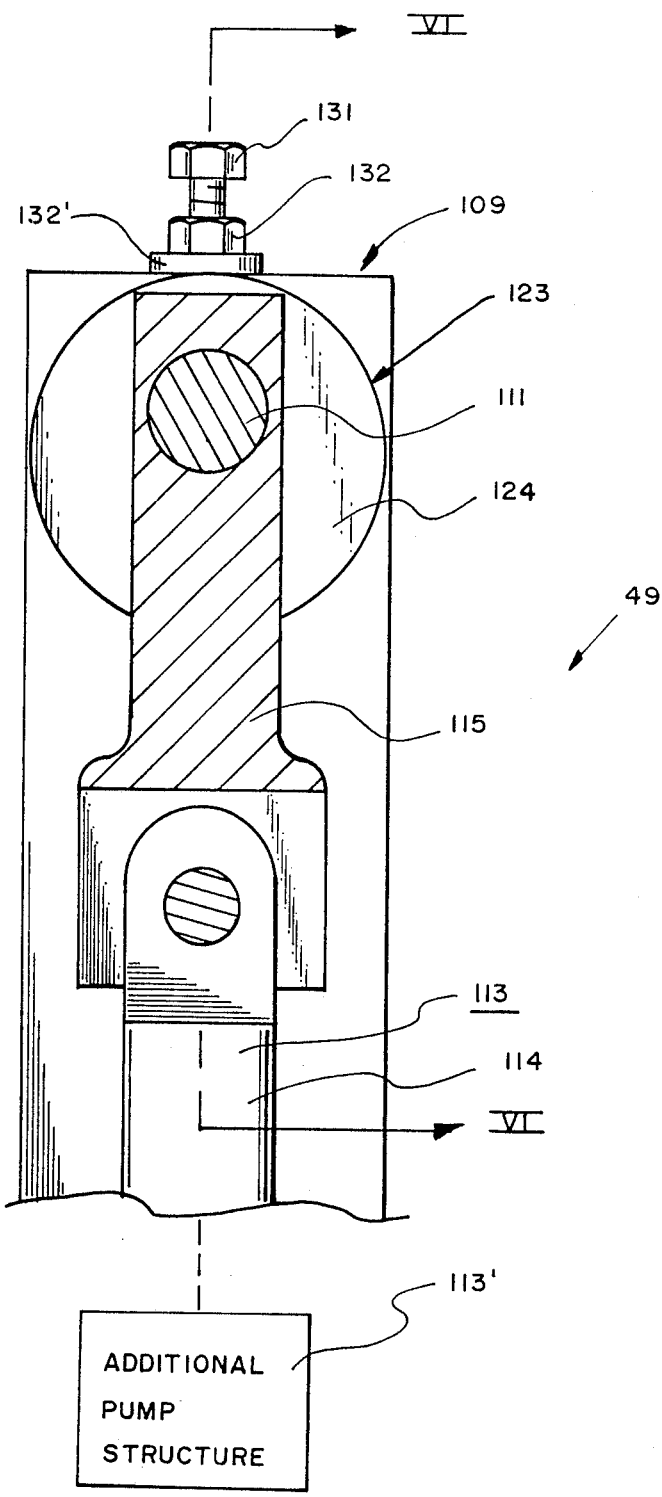
FIG. 5 is an enlarged sectional view substantially as taken on line V—V of FIG. 4 with portions thereof omitted for clarity.
Figure 6:
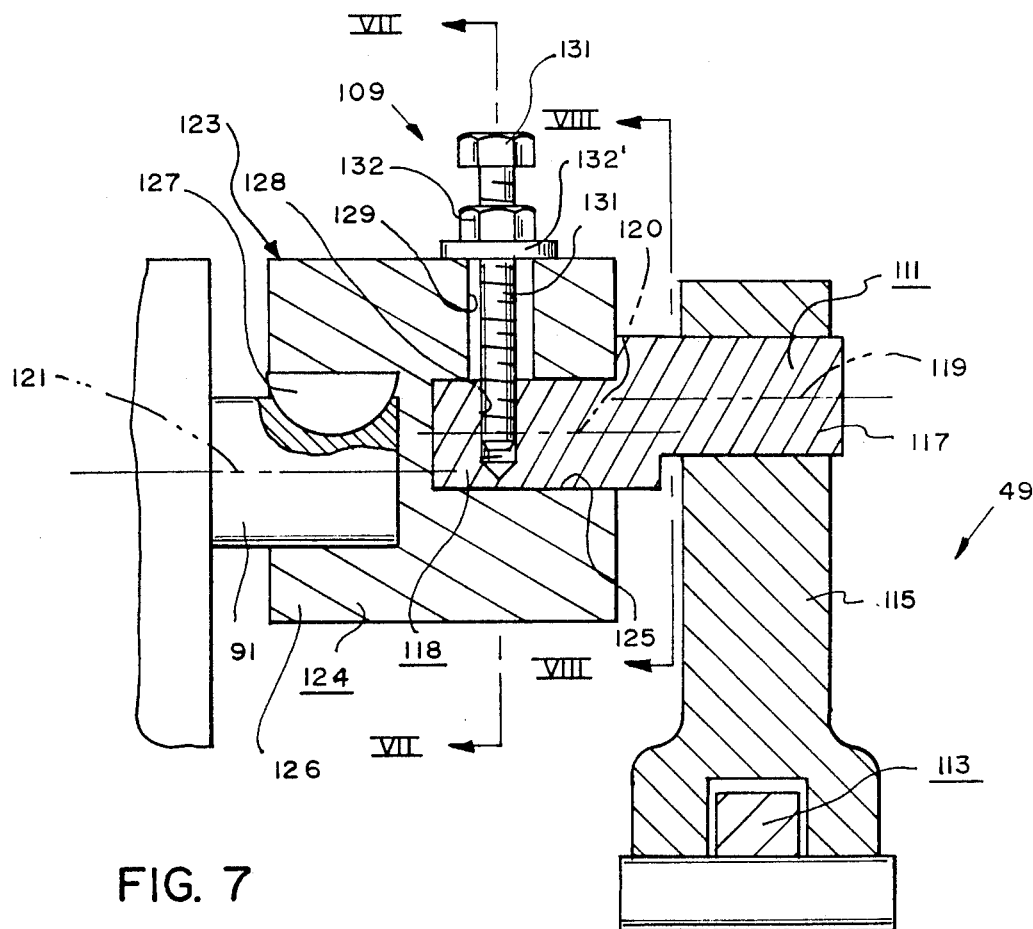
FIG. 6 is a sectional view substantially as taken on line VI—VI of FIG. 5.
Figure 7:
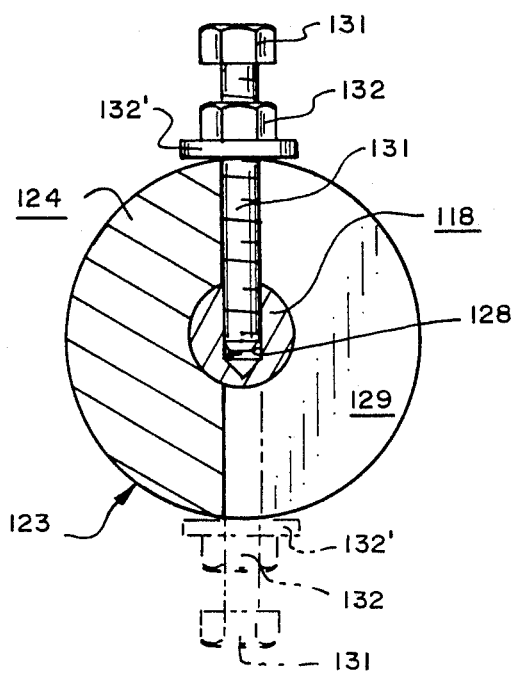
FIG. 7 is a sectional view substantially as taken on line VII—VII of FIG. 6 with portions thereof omitted for clarity.
Figure 8:
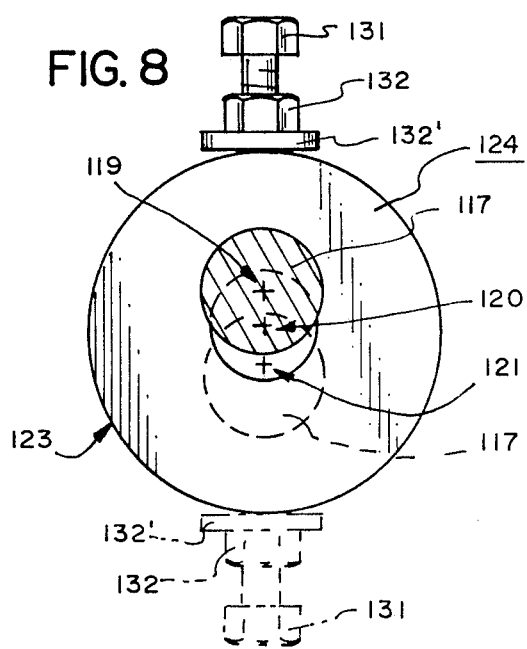
FIG. 8 is a sectional view substantially as taken on line VIII—VIII of FIG. 6 with portions thereof omitted for clarity.
Figure 9:
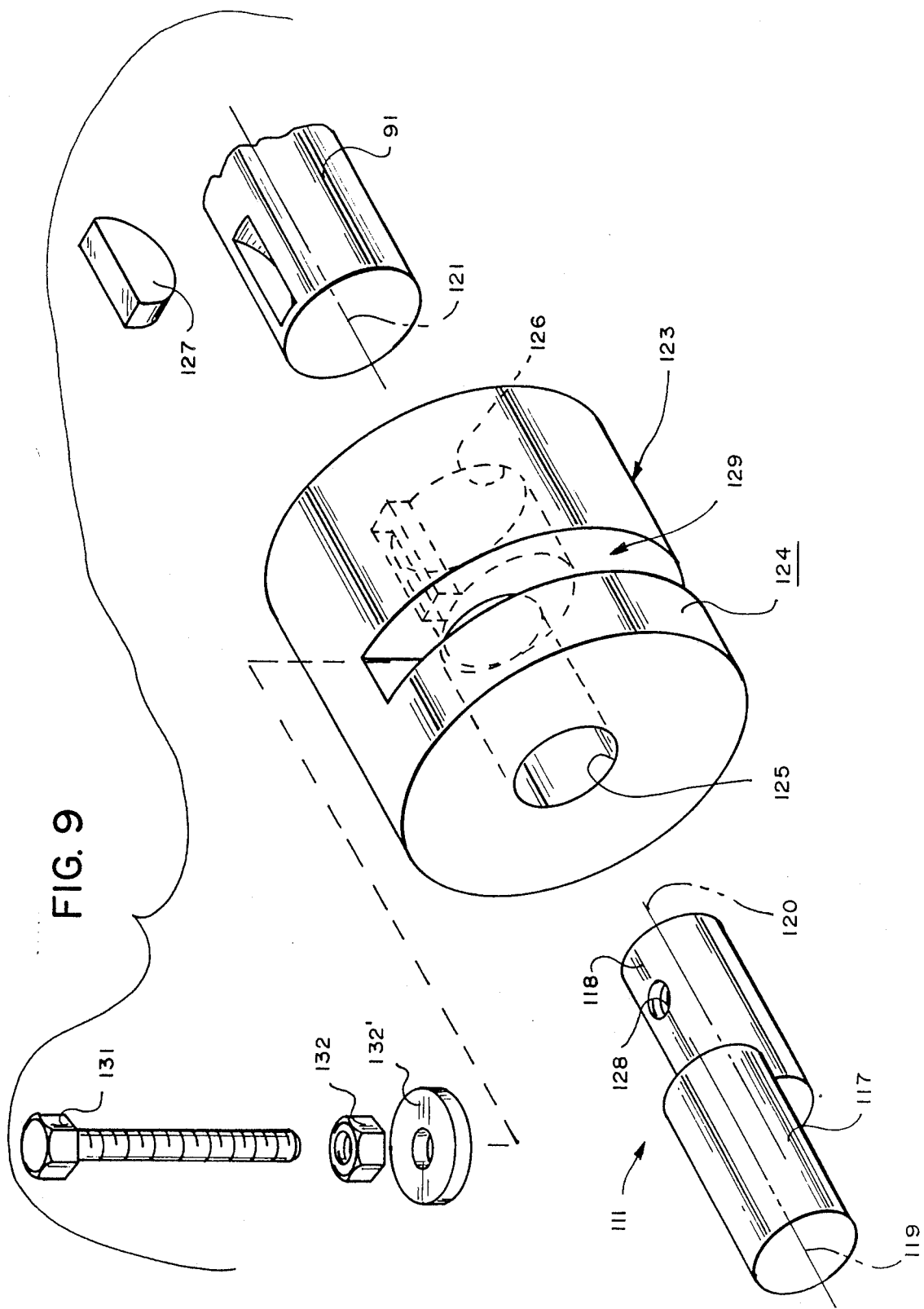
FIG. 9 is an exploded perspective view of certain components of the drive mechanism of the sprayer of FIG. 1.
Figure 10:
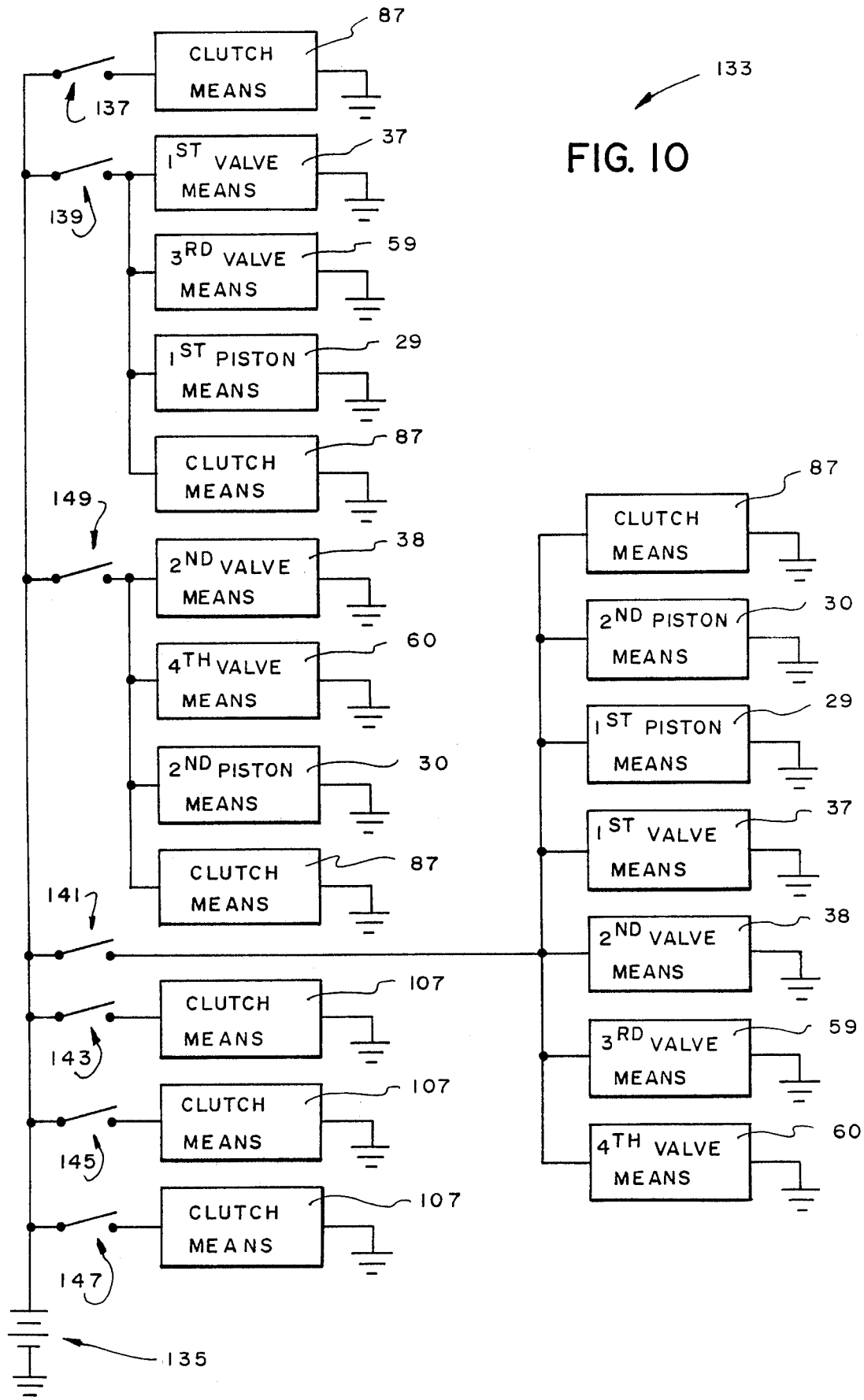
FIG. 10 is a schematic view of the electrical circuit means of the sprayer of FIG. 1.
Figure 15:
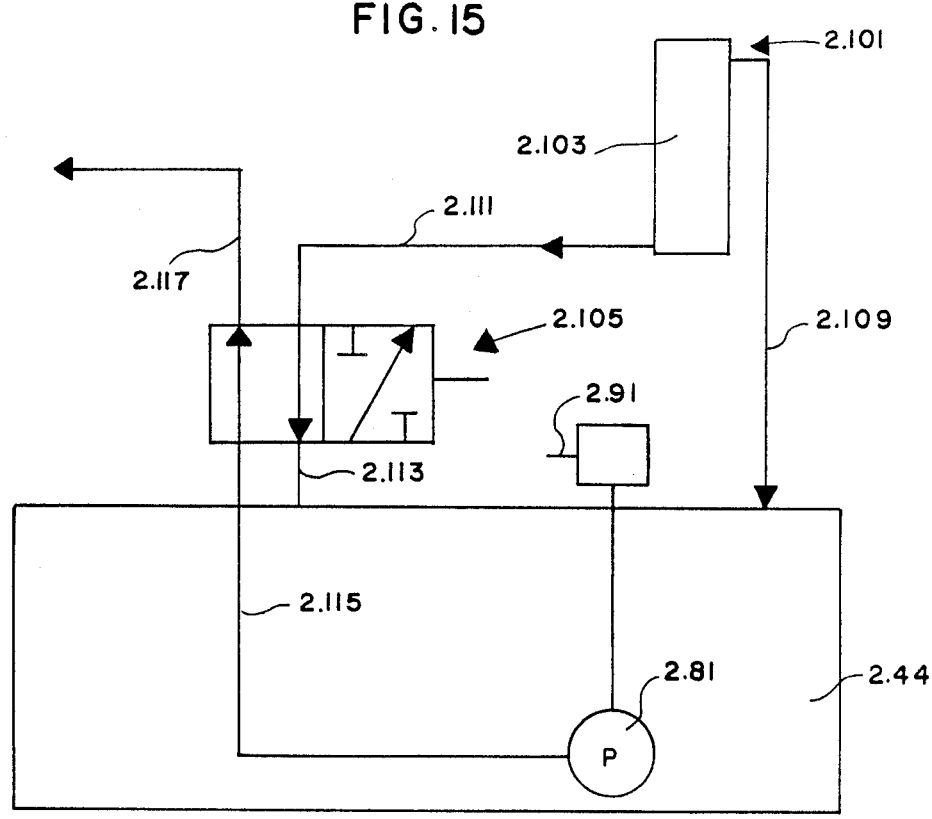
FIG. 15 is a diagrammatic view of a portion of the hydraulic system of the sprayer of FIG. 11 showing the control valve of a cartridge in a normal in use position.
Figure 16:
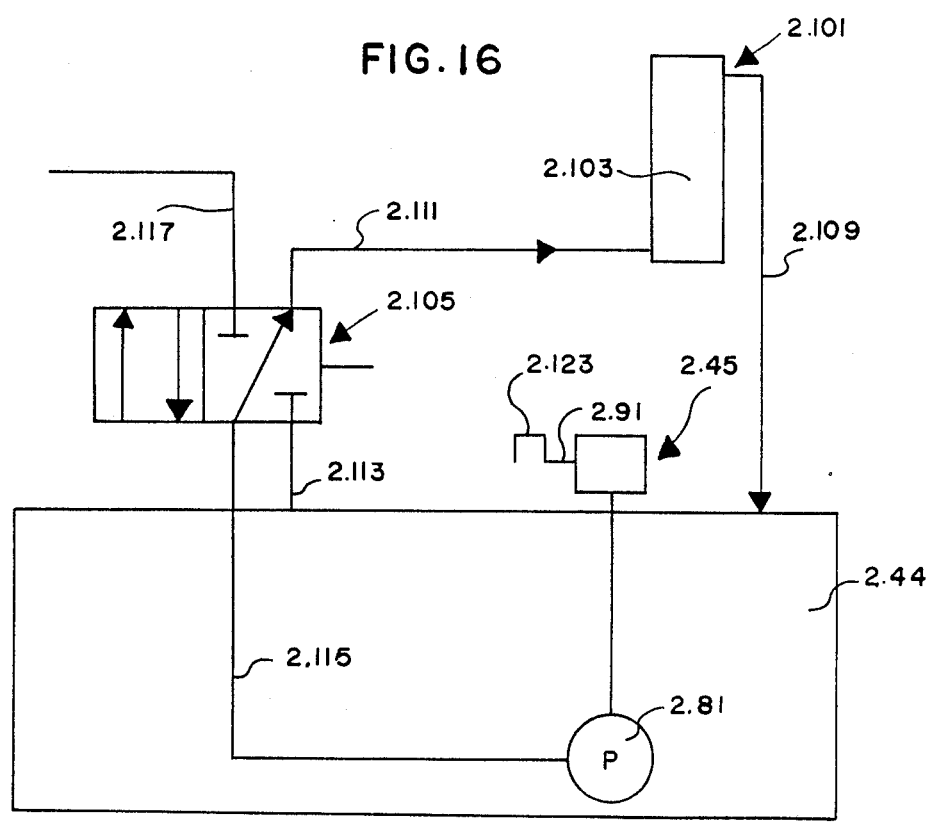
FIG. 16 is a view similar to FIG. 15 but showing the control valve in a calibrating position.

The sprayer 11 may include a second frame 69 with a hitch means 70 mounted on the front thereof for allowing the frame 69 to he removably attached to the rear of the frame 13 (see FIGS. 1 and 2). The tanks 39, 41, 43, pump means 45, 47, 49, sensing means 61 and associated structure are preferably attached to the frame 69 as shown in FIGS. 1-3.

The sprayer 11 includes variable drive means 71 operatively coupled to the sensing means 61 and to the chemical pump means 45, 47, 49 (see FIGS. 1 and 4) for varying the output of the chemical pump means 45, 47, 49 in proportion to the speed at which the sprayer 11 is moved over the field. The variable drive means 71 preferably includes a transfer drive shaft 73, a first drive means 75 for selectively driving the chemical pump means 45, 47, 49 at a first speed, a second drive means 77 for selectively driving the chemical pump means 45, 47, 49 at a second speed, and a third drive means 79 for selectively driving the chemical pump means 45, 47, 49 at a third speed. Each of the drive means 75, 77, 79 preferably includes a first sprocket member 81 attached to the ground-engaging wheel shaft 67 for being rotated by the ground-engaging wheel shaft 67, a second sprocket member 83 attached to the transfer drive shaft 73 for rotating the transfer drive shaft, a chain member 85 coupling the first and second sprocket members 81, 83 to one another for causing the second sprocket member 83 to rotate when the first sprocket member 81 rotates at a speed proportional to the speed at which the first sprocket member 81 is rotating, and an electromagnetic clutch means 87 for disengageably coupling one of the sprocket members 81, 83 to the respective one of the shafts 67, 73. The ratios between the first and second sprocket members 81, 83 of the first drive means 75 may be calculated so as to cause the transfer drive shaft 73 to rotate at the same speed at which the ground-engaging wheel shaft 67 is rotating. The ratios between the first and second sprocket members 81, 83 of the second drive means 77 may be calculated so as to cause the transfer drive shaft 73 to rotate at two-thirds the speed at which the ground-engaging wheel shaft 67 is rotating. The ratios between the first and second sprocket members 81, 83 of the third drive means 79 may be calculated so as to cause the transfer drive shaft 73 to rotate at one-third the speed at which the ground-engaging wheel shaft 67 is rotating. The specific ratios selected depend on many variables as will now be apparent to those skilled in the art. Thus, if it is desired to vary the output of the chemical pump means 45, 47, 49 depending on whether either or both right and left manifold members 19, 21 are in the down, in-use position, the ratios will depend on the relative lengths of the right and left manifold members 19, 21 as compared to the middle manifold member 21 as will now he apparent to those skilled in the art.

The variable drive means 71 preferably includes a chemical pump drive means 89 operatively coupled to the transfer drive shaft 73 and to the chemical pump means 45, 47, 49 (see FIG. 4) for selectively driving the chemical pump means 45, 47, 49 when the transfer drive shaft 73 is being rotated. The chemical pump drive means 89 preferably includes a chemical pump drive shaft 91 for each chemical pump means 45, 47, 49 and preferably includes a first chemical pump drive means 93 for selectively driving the first chemical pump means 45, a second chemical pump drive means 95 for selectively driving the second chemical pump means 47, and a third chemical pump drive means 97 for selectively driving the third chemical pump means 49. Each chemical pump drive means 93, 95, 97 preferably includes a first sprocket member 99 attached to the transfer drive shaft 73 for being rotated when the transfer drive shaft 73 is rotated, a second sprocket member 101 attached to the respective chemical pump drive shaft 91 of the chemical pump drive means 89, a chain member 103 for coupling the first and second sprocket members 99, 101 to one another for causing the second sprocket member 101 to rotate when the first sprocket member 99 is rotated at a speed proportional to the speed at which the first sprocket member 99 is rotating, and an electromagnetic clutch means 107 for disengageably coupling one of the sprocket members 99, 101 to the respective one of the shafts 73, 91.

The chemical pump drive means 89 preferably includes an adjustment means 109 associated with each chemical pump means 45, 47, 49 (see, in general, FIGS. 4 and 6) for allowing the output volume of each chemical pump means 45, 47, 49 to be varied. Each adjustment means 109 preferably includes a crank means 111 operatively coupled to the respective chemical pump drive shaft 91 of the chemical pump drive means 89 for being rotated by said chemical pump drive shaft 91. Each pump means 45, 47, 49 preferably includes a piston means 113 operatively coupled to the crank means 111 for being reciprocated by the crank means 111 when the crank means 111 is rotated by the respective chemical pump drive shaft 91 and typical additional pump structure 113' of the reciprocating type, or the like, well known to those skilled in the art, associated with the piston means 113 (see FIG. 5) for coacting with the piston means 113 to pump chemicals from the respective chemical tank 39, 41, 43. The piston means 113 preferably includes a piston 114 and a connecting arm portion 115 pivotally connected to the top of the piston 114. The crank means 111 preferably includes a first crank arm 117 pivotally connected to the top of the connecting arm portion 115 and a second crank arm 118. The first crank arm 117 has a longitudinal axis 119. The second crank arm 118 has a longitudinal axis 120. Each chemical pump drive shaft 91 has a longitudinal axis 121.

The adjustment means 109 preferably includes an adjustable connecting means 123 (see FIG. 6) for allowing the longitudinal axis 119 of the first crank arm 117 to be moved relative to the longitudinal axis 121 of the associated chemical pump drive shaft 91 to vary the effective throw of the crank means 111 and the effective stroke of the piston means 113 and to thereby vary the output volume of the chemical pump means 45, 47, 49 as will now he apparent to those skilled in the art. The connecting means 123 may include a sleeve 124 having an aperture 125 in one end thereof for receiving the second crank arm 118 and an aperture 126 in the other end thereof for receiving one of the chemical pump drive shaft 91. Each shaft 91 is preferably fixedly attached to a respective sleeve 124 in any manner now apparent to those skilled in the art, such as by way of a key 127 whereby rotation of the shaft 91 will cause the sleeve 124 to rotate. Preferably, the second crank arm 118 has a transverse threaded aperture 128 therethrough, the sleeve 124 has a transverse slot 129 through a portion thereof, and the adjustment means 109 includes a threaded bolt member 131 for extending through the slot 129 in the sleeve 124 and for threadingly engaging the aperture 128 in the second crank arm 118. A lock nut 132 and washer 132' are provided on the bolt member 131 to allow the bolt member 131 to be locked to the sleeve 124 at various selected points along the slot 129 to thereby secure the second crank arm 118 to the sleeve 124 whereby rotation of each shaft 91 will cause the associated sleeve 124 and crank means 111 to rotate. The longitudinal axes 119, 121 are offset from the longitudinal axis 120 whereby rotation of the crank arm 118 within the aperture 125 will vary the throw of the crank means 111 as will now be apparent to those skilled in the art.

The sprayer 11 preferably includes a circuit means 133 (see FIG. 10) for electrically coupling various elements thereof to a source of electrical energy such as a battery 135. The circuit means 133 preferably includes switch means for electrically controlling the clutch means 87 of the drive means 73, 75, 77 and switch means for electrically controlling the clutch means 107 of the chemical pump drive means 89. More specifically, the circuit means 133 preferably includes a first switch member 137 for electrically controlling the clutch means 87 of the first drive means 75, a second switch member 139 for electrically controlling the clutch means 87 of the second drive means 77, a third switch member 141 for electrically controlling the clutch means 87 of the third drive means 79, a fourth switch member 143 for electrically controlling the clutch means 107 of the first chemical pump drive means 93, a fifth switch member 145 for electrically controlling the clutch means 107 of the second chemical pump drive means 95, and a sixth switch member 147 for electrically controlling the clutch means 107 of the third chemical pump drive means 97. The second switch member 139 is preferably electrically associated with the first and third valve means 37, 59 and the first piston means 29 for causing the first and third valve means 37, 59 to close and causing the first piston means 29 to move the right manifold means 19 to the up or out-of-use position when the second switch member 139 is closed. The third switch member 141 is preferably electrically associated with the first, second, third and fourth valve means 37, 38, 59, 60 and the first and second piston means 29, 30 for causing the valve means 37, 38, 59, 60 to close and causing the piston means 29, 30 to move the right and left manifold means 19, 21 to the up, out-of-use positions when the third switch member 141 is closed. The circuit means 133 preferably includes a seventh switch member 149 for electrically controlling the clutch means 87 of the second drive means 77. The seventh switch member 149 is preferably associated with the second and fourth valve means 38, 60 and the second piston means 30 for causing the second and third valve means 38, 60 to close and causing the second piston means 30 to move the left manifold means 21 to the up, out-of-use position when the seventh switch member 149 is closed.

The operation and use of the sprayer 11 is quite simple. The initial step is to adjust the output of each chemical pump means 45, 47, 49 based on the amount of flow desired per revolution of the respective chemical pump drive shaft 91. The actual adjustment is performed with each respective adjustment means 109 by loosening the lock nut 132 and rotating the crank means 111 to a desired position and then tightening lock nut 132. Thus, the throw thereof may be varied by changing the amount of offset between the longitudinal axes 119, 121 as will now be apparent to those skilled in the art. The actual output of each chemical pump means 45, 47, 49 may be checked using a calibrated container to measure the output through each respective outlet conduit 51. With the sprayer 11 being moved over a field in the direction of the arrow 16, the operator of the sprayer 11 need only close one of the switches 137, 139, 141, 149 depending on the ratio of spray with respect to the speed of rotation of the ground-engaging wheel shaft 67 desired, and to close one or more of the switches 143, 145, 147 depending on which pump means 45, 47, 49 is to be activated as will now be apparent to those skilled in the art.

A second embodiment of the fluid sprayer of the present invention is shown in FIGS. 11–16 and identified by the numeral 2.11. The sprayer 2.11 preferably includes a frame 2.13 having a hitch means 2.15 located at the front thereof for allowing the frame 2.13 to be removably coupled to the tractor T (see FIG. 11) to allow the sprayer 2.11 to be pulled over the field by the tractor T as will now be apparent to those skilled in the art.

The sprayer 2.11 includes an elongated manifold means 2.17 coupled to the frame 2.13 in a manner so that the longitudinal axis 2.18 of the manifold means 2.17 is located transverse to the general direction of travel of the sprayer 2.11.

The manifold means 2.17 preferably includes an elongated right manifold member 2.19, an elongated left manifold member 2.21, and an elongated middle manifold member 2.23. Each manifold member 2.19, 2.21, 2.23 includes a hollow interior for receiving the fluid mixture to be sprayed onto the field. A plurality of spaced spray nozzles, not shown, but preferably like the spray nozzles 27 of sprayer 11 (see FIG. 2), are mounted on each manifold member 2.19, 2.21, 2.23 in communication with the interiors thereof for allowing a fluid mixture to be sprayed therethrough from the interiors thereof. Hinge means 2.28 are preferably provided for hingeably joining the right and left manifold members 2.19, 2.21 to the right and left ends respectively of the middle manifold member 2.23 in a manner which allows the right and left manifold members 2.19, 2.21 to be moved between a down or in-use position for spraying the fluid mixture onto the field and an up or out-of-use position. The sprayer 2.11 preferably includes a first piston means 2.29 for selectively moving the right manifold member 2.19 between the down or in-use position and the up or out-of-use position and preferably includes a second piston means 2.30 for selectively moving the left manifold member 2.21 between the down or in-use position and the up or out-of-use position. The specific construction of the manifold member 2.17 may vary as will be apparent to those skilled in the art.

The sprayer 2.11 includes a water tank 2.31 for holding a quantity of water to be sprayed (see FIG. 11). The water tank 2.31 is secured to the frame 2.13 and may be of any typical construction well known to those skilled in the art.

The sprayer 2.11 includes a water pump means 2.33 operatively coupled to the manifold means 2.17 and to the water tank 2.31 for selectively pumping water from the water tank 2.31 to the manifold means 2.17 and out the spray nozzles, not shown. The water pump means 2.33 may be of any typical construction and operation well known to those skilled in the art. An inlet conduit 2.35 may extend from the interior of the water tank 2.31 to the inlet port of the water pump means 2.33, and one or more outlet conduits 2.36 may extend from the outlet port or ports of the water pump means 2.33 to the interior of the manifold means 2.17 (see, in general, FIG. 11). Typical electrical circuitry and the like may be provided to control the operation of the pump means 2.33 in the typical manner well known to those skilled in the art.

The sprayer 2.11 preferably includes a first valve means 2.37 for selectively controlling the flow of fluid through the conduit 2.36 from the pump means 2.33 to the right manifold member 2.19 and preferably includes a second valve means 2.38 for selectively controlling the flow of fluid through the conduit 2.36 from the pump means 2.33 to the left manifold member 2.21.

The sprayer 2.11 includes at least one and preferably a first cartridge 2.39 for holding a quantity of a first chemical to be sprayed with the water, a second cartridge 2.41 for holding a quantity of a second chemical to be sprayed with the water, and a third cartridge 2.43 for holding a quantity of a third chemical to be sprayed. The cartridges 2.39, 2.41, 2.43 are alike and each includes a chemical tank 2.44 (see cartridge 2.39 shown in FIGS. 12, 13, and 14). Also, each of the cartridges 2.39, 2.41, 2.43 includes chemical pump means 2.45 respectively operatively coupled to the manifold means 2.17 and to a chemical tank 2.44 for selectively pumping chemicals from each of the chemical tanks 2.44 to the manifold means 2.17 and out the nozzles with the water.

An outlet conduit 2.51 preferably extends from each of the cartridges 2.39, 2.41, 2.43 to an intermediate manifold member 2.53 (see FIG. 11). A first outlet conduit 2.55 preferably extends from intermediate manifold member 2.53 to a place in the right manifold member 2.19 adjacent the place where water enters into the manifold member 2.19 through one of the conduits 2.36 for allowing a quantity of chemical to pass from the intermediate manifold member 2.53 to the right manifold member 2.19 (see FIG. 11). A second outlet conduit 2.57 preferably extends from the intermediate manifold member 2.53 to a place in the left manifold member 2.21 adjacent the place where water enters into the manifold member 2.21 through one of the conduits 2.36 for allowing a quantity of chemical to pass from the intermediate manifold member 2.53 to the left manifold member 2.21 (see FIG. 11). A third outlet conduit 2.58 preferably extends from the intermediate manifold member 2.53 to a place in the middle manifold member 2.23 adjacent the place where water enters into the manifold member 2.23 through one of the conduits 2.36 for allowing a quantity of chemical to pass from the intermediate manifold member 2.53 to the middle manifold member 2.23 (see FIG. 11). The sprayer 2.11 preferably includes a third valve means 2.59 for selectively controlling the flow of fluid through the first outlet conduit 2.55 from the intermediate manifold member 2.53 to the right manifold member 2.19 and preferably includes a fourth valve means 2.60 for selectively controlling the flow of fluid through the second outlet conduit 2.57 from the intermediate manifold member 2.53 to the left manifold member 2.21.

It will be understood from the foregoing that by having the chemicals entering the manifold member 2.17 at places in the manifold member adjacent the places where the water enters into the manifold member and where the chemicals are mixed with the water, the portion of the system that is contaminated with the chemical/water mixture is reduced so that the amount of flushing needed when chemicals are changed is also reduced.

The sprayer 2.11 includes sensing means 2.61 for sensing the speed at which the sprayer is moving over the field (see FIGS. 11). The sensing means 2.61 preferably includes a ground-engaging wheel means 2.63 for engaging the ground as the sprayer 2.11 is moved over the field. The ground-engaging wheel means 2.63 preferably includes at least one, and preferably a spaced pair of ground-engaging wheels 2.65 for being rotated by the ground as the sprayer 2.11 is moved over the field and includes a ground-engaging wheel shaft 2.67 for being rotated by the ground-engaging wheels 2.65 as the sprayer 2.11 is moved over the field at a speed proportional to the speed at which the sprayer 2.11 is being moved over the field.

The sprayer 2.11 may include a second frame 2.69 with a hitch means 2.70 mounted on the front thereof for allowing the frame 2.69 to be removably attached to the rear of the frame 2.13 (see FIGS. 11).

The construction and operation of the above components may be substantially similar to the like components of the first sprayer 11 as heretofore described and reference should be made thereto for a more complete disclosure and understanding.

The principal differences between the first and second embodiments of the sprayers of the present invention are: (1) In sprayer 2.11 the cartridges 2.39, 2.41, 2.43 are adapted to be selectively quickly removed and replaced, and the number of cartridges attached to frame 2.69 is variable, as opposed to the fixed chemical tanks 39, 41, 43 of sprayer 11. (2) In sprayer 2.11 the cartridges 2.39, 2.41, 2.43 are each a self-contained unit that can be used as a removable and transportable refillable container and that has calibration means incorporated therein, which is not true of sprayer 11. (3) In sprayer 2.11 the overall drive means is more versatile than the drive means of sprayer 11, as will be more fully understood in the description to follow.

Each of cartridges 2.39, 2.41, 2.43 are substantially alike and the following description for cartridge 2.39 will suffice for all.

Cartridge 2.39 comprises a box-like hollow body member 2.71 open at the upper end thereof (see FIGS. 12-14). A partition 2.73 in body member 2.71 divides the body member 2.71 into the lower closed tank 2.44 for holding a quantity of liquid chemicals to be dispensed and an upper open-ended compartment 2.75. A removable top 2.77 is mounted on the open end 2.79 of the upper compartment 2.75 for the closing thereof and for providing access to the interior of the upper compartment 2.75.

Cartridge 2.39 includes the pump means 2.45 which is preferably constructed and operates in a manner similar to the pump means 45. Pump means 2.45 comprises a double acting plunger pump 2.81 located in closed tank 2.44 and includes piston means 2.83 extending upward through an aperture in partition 2.73 into the upper compartment 2.75. The pump means 2.45 includes pump actuating means 2.87 comprising a connecting arm portion 2.89 operatively connected to piston means 2.83, a chemical pump drive shaft 2.91, and an adjustment means 2.93 coupling chemical drive shaft 2.91 to connecting arm portion 2.89 for selectively varying the output of chemical pump means 2.45. Adjustment means 2.93 is preferably substantially similar to adjustment means 109 and reference should be made thereto for a more detailed description thereof as to its construction and operation. Suitable support means such as supports 2.94, well known to those skilled in the art, are provided for the support of drive shaft 2.91, which extends through an aperture in body member 2.71. It will be understood that when chemical pump drive shaft 2.91 is rotated it will cause actuation of pump 2.81 and that the output of pump 2.81 may be varied by means of adjustment means 2.93.

A first coupler half 2.95 of a quick disconnect coupler 2.97 is fixedly mounted on chemical pump drive shaft 2.91 and accessible from the outside of hollow body member 2.71 for the rotation of chemical pump drive shaft 2.91. Coupler 2.97 includes a second coupler half 2.99 adapted to be removably and quickly fitted with first coupler half 2.95 without the aid of tools or the like. Coupler 2.97 is preferably of the type well known to those skilled in the art which is sold as a "Flexible Coupling" and which preferably includes a "Spider" (rubber piece between the two parts of the coupling) marketed by the Lovejoy Company, 2655 Wisconsin Ave., Downers Grove, Ill. 60515. Cartridge 2.39 also includes calibration means 2.101 (see FIGS. 12, 13, 15, and 16) for determining the output of pump 2.81 relative to a predetermined number of revolutions of chemical pump drive shaft 2.91. Calibration means 2.101 includes, in general, a hollow calibration cylinder 2.103, closed at the top and bottom thereof, having suitable calibration marks 2.104 thereon and includes a valve 2.105. Valve 2.105 is preferably a two position spool valve well known to those skilled in the art movable by a handle 2.107 between a first position shown in FIG. 16 and a second position shown in FIG. 15. Calibration means 2.101 also includes suitable conduit means which comprises a vent hose 2.109 communicating the upper interior of calibration cylinder 2.103 with the interior of tank 2.44, a conduit 2.111 communicating the lower interior of calibration cylinder 2.103 with valve 2.105, a conduit 2.113 communicating valve 2.105 with the interior of tank 2.44, a conduit 2.115 communicating the output of pump 2.81 with valve 2.105 and a conduit 2.117 communicating valve 2.105 with a quick disconnect fitting 2.119 preferably of a type well known to those skilled in the art, e.g., a so called dry coupling fitting marketed by Hansen Coupling Division of Tuthill Corporation of Cleveland, Ohio, Model No. ML4-H 26, which is adapted to removably receive a corresponding fitting 2.121, Model No. ML 4-K 26, marketed by the same company and well known to those skilled in the art. Fitting 2.121 is attached to outlet conduit 2.51 whereby when fitting 2.121 is joined with fitting 2.119 the output of hydraulic fluid from cartridge 2.39 is communicated with intermediate manifold member 2.53, and the same is true of cartridges 2.41, 2.43.

When valve 2.105 is in said first position (see FIG. 16) conduit 2.115 is in communication with conduit 2.111 whereby the output of pump 2.81 is in communication with the interior of cylinder 2.103 so that by rotating shaft 2.91 as by means of a suitable handle 2.123, well known to those skilled in the art, and by setting the adjustment means 2.93, the operator can calibrate the cartridge 2.39. In other words, he is able to set the desired amount of volume of fluid that pump 2.81 puts out per revolution of shaft 2.91 by adjusting the stroke setting of pump 2.81 with adjustment means 2.93. He is able to determine said volume for any given setting by observing the height of the fluid in calibration cylinder 2.103 per revolution of shaft 2.91 as shown by calibration marks 2.104.

When valve 2.105 is in said second position (see FIG. 15), conduit 2.115 is in communication with conduit 2.117 whereby the output of pump 2.81 is available at fitting 2.119 so that when fitting 2.121 is joined therewith the fluid will be available to flow to the portion or portions of manifold 2.17 desired. Also, when valve 2.105 is in said second position, conduit 2.111 is in communication with conduit 2.113 so that a path is provided for the return of any fluid in calibration cylinder 2.103 back to tank 2.44.

From the foregoing it will be understood that calibration means 2.101 is a closed calibration unit, that is, the calibration operation may be performed as many times as desired and the valve 2.105 changed between said first and second positions as necessary without the operator having to come in contact with the chemicals.

Additionally, cartridge 2.39 includes a quick disconnect dry coupling fitting 2.125 which is well known to those skilled in the art and preferably is substantially similar to fitting 2.119, but preferably is of a different size, namely Model No. ML8-H 36. Fitting 2.125 is mounted on the outside of body member 2.71 and is in communication with the interior of tank 2.44 whereby the tank may be filled with liquid chemicals without having to open the tank. However, if it is necessary to open tank 2.44 for any reason, as for example, to clean the tank, then a bung 2.126, which is preferably provided in a bunghole in partition 2.73, may be used to gain access to the interior of tank 2.44.

One or more of the cartridges 2.39, as desired, are removably mounted on second frame 2.69. When more than one cartridge is so mounted, as shown by the cartridges 2.39, 2.41, 2.43 in FIG. 11, the cartridges are preferably mounted in spaced relationship. The means for mounting cartridges 2.39, 2.41, 2.43 and the construction of frame 2.69 for so mounting the cartridges is described hereinafter.

Frame 2.69 preferably includes pairs of spaced-apart angle members 2.127 extending transverse to the direction of movement of sprayer 2.11 over the ground to establish a plurality of attachment rails 2.129 (see FIG. 13). Included in frame 2.69 are suitable structural members, not shown, but well known to those skilled in the art, for supporting rails 2.129 and for attaching sensing means 2.61 to frame 2.69.

Attaching means 2.131 is provided for quickly attaching and detaching cartridge means 2.39, 2.41, 2.43 to and from attachment rails 2.129 and for permitting selective movement, as desired, of the cartridge means along rails 2.129 for adjustment of the positions thereof. Attaching means 2.131 preferably includes a plurality of threaded studs 2.133 welded or otherwise secured to the bottom of body member 2.71, plates 2.135 having apertures therein through which studs 2.133 respectively extend, and nuts 2.139 threaded onto studs 2.133 for holding the cartridge means in selected fixed locations on rails 2.129.

Overall drive means 2.141 is operatively coupled to sensing means 2.61 and to cartridge means 2.39, 2.41, 2.43 for varying the output of the cartridge means 2.39, 2.41, 2.43 in proportion to the speed at which sprayer 2.11 is being moved over the field. In addition, each of the individual cartridge means 2.39, 2.41, 2.43 may be set to a specific output of chemicals depending upon the desired application at and given time of the chemicals onto the field, as will be understood more fully from the description to follow hereinafter.

Overall drive means 2.141 includes a main gear box 2.143 mounted on frame 2.69 and a plurality of intermediate gear boxes 2.145 adjustably and removably mounted on frame 2.69. There is preferably one gear box 2.145 for each cartridge 2.39, 2.41, 2.43. Each of the intermediate gear boxes 2.145 and main gear box 2.143 includes an input shaft 2.147 and an output shaft 2.149. There are a plurality of connecting rods 2.151 removably connecting the input shafts 2.147 of intermediate gear boxes 2.145 together for conjoint movement of the input shafts. The input shafts 2.147 and rods 2.151 are preferably coupled together by means of quick couplers 2.153; the output shaft 2.149 of main gear box 2.143 is removably coupled to the input shaft 2.147 of one of the intermediate gear boxes 2.145 by means of a quick coupler 2.155 to establish an input shaft assembly 2.156 for conjoint movement of output shaft 2.149 of the main gear box 2.143 and the input shafts 2.147 of the intermediate gear boxes 2.145. Quick couplers 2.97 removably couple the output shafts 2.149 of the intermediate gear boxes 2.145 respectively to the chemical pump drive shafts 2.91 of the cartridges 2.39, 2.41, 2.43 for the driving thereof. All of the couplers 2.153, 2.155, and 2.97 are preferably of the quick coupling type previously described relative to coupler 2.97.

Each of the intermediate gear boxes 2.145 includes variable intermediate drive means 2.157 and main gear box 2.143 includes variable main drive means 2.158. The drive means 2.157 and 2.158 are preferably substantially identical and each includes a first drive means 2.159 for selectively driving the output shaft 2.149 at a first speed, a second drive means 2.161 for selectively driving the output shaft 2.149 at a second speed, and a third drive means 2.163 for selectively driving the output shaft 2.149 at a third speed. Each of the drive means 2.159, 2.161, 2.163 preferably includes a first sprocket member 2.165 attached to the input shaft 2.147 for being rotated by input shaft 2.147, a second sprocket member 2.167 meshed with first sprocket member 2.165 and attached to the output shaft 2.149 for rotating the output shaft 2.149, and an electromagnetic clutch means 2.169 for selectively disengagingly coupling output shaft 2.149 with second sprocket member 2.167.

A drive mechanism 2.171 which is a part of the overall drive means 2.141 is provided for rotating the input shaft 2.147 of main gear box 2.143 in response to rotation of ground-engaging wheel 2.65. Drive mechanism 2.171 includes suitable drive means well known to those skilled in the art and preferably includes a drive chain 2.173 engaging sprockets 2.175 respectively mounted on ground-engaging wheel shaft 2.67 and on a stub shaft 2.177 rotatably mounted from frame 2.69 by means well known to those skilled in the art, and which stub shaft 2.177 is coupled to the input shaft 2.147 of main gear box 2.143 by a coupler 2.179 substantially similar to quick coupler 2.97.

Main gear box 2.143 and intermediate gear boxes 2.145 each preferably includes a housing 2.181 which houses the respective drive means 2.158, 2.157. The housing 2.181 of main gear box 2.143 is preferably fixedly mounted on frame 2.69 by suitable means well known to those skilled in the art, but, if desired, it may be removably mounted from frame 2.69, in the manner, for example, like the removable mountings of the housings of intermediate gear boxes 2.145 as will be hereinafter described.

Each intermediate gear box 2.145 preferably includes a plurality of legs 2.183 fixedly attached to the housing 2.181 and depending therefrom to a base plate 2.185 and to which the legs are fixedly attached by suitable means as by welding or the like. Each of the base plates 2.185 of the intermediate gear boxes 2.145 is preferably removably attached to the attachment rails 2.129 in the same manner as cartridges 2.39, 2.41, 2.43, that is, by quick attaching means 2.131 so that the intermediate gear boxes 2.145 may be removed or selectively positioned along the attachment rails and secured thereto in a selected position.

The ratios between the first and second sprocket members 2.165, 2.167 of the first drive means 2.159 of the main gear box 2.143 may be calculated so as to cause the output shaft 2.149 of main gear box 2.143 and input shaft assembly 2.156 to rotate at the same speed at which the ground-engaging wheel shaft 2.67 is rotating. The ratios between the first and second sprocket members 2.165, 2.167 of the second drive means 2.161 of the main gear box 2.143 may be calculated so as to cause the output shaft 2.149 and input shaft assembly 2.156 to rotate at two-thirds the speed at which the ground-engaging wheel shaft 2.67 is rotating. The ratios between the first and second sprocket members 2.165, 2.167 of the third drive means 2.163 may be calculated so as to cause the output shaft 2.149 of the main gear box 2.143 and the input shaft assembly 2.156 to rotate at one-third the speed at which the ground-engaging wheel shaft 2.67 is rotating. The specific ratios selected depend on many variables as will now be apparent to those skilled in the art. Thus, if it is desired to vary the output of the cartridges 2.39, 2.41, 2.43 depending on whether either or both right and left manifold members 2.19, 2.21 are in the down, in-use position, the ratios will depend on the relative lengths of the right and left manifold members 2.19, 2.21 as compared to the middle manifold member 2.23 as will now be apparent to those skilled in the art. Similarly, since each of the cartridges 2.39, 2.41, 2.43 preferably has its own gear box the ratios may be selected depending upon the particular chemicals to be used and the field conditions expected to be encountered. Further, since each intermediate gear box 2.145 has a selection of drive rates that it drives its corresponding cartridge to give the desired output of the cartridge and since each of the cartridges may carry a different chemical, so called prescription weed and pest control is made possible. For example, if a field is being sprayed with one or two chemicals and the operator comes to a group of weeds or an insect population, the particular cartridge containing the applicable chemical for weed or insect control may be turned on and at the rate desired for spot treating and then turned off again. Also, at another place in the field, a different rate may be needed depending upon the density, etc. of the weeds or insects, which can easily and quickly be taken care of by the versatile and effective sprayer of the present invention.

A third embodiment of the fluid sprayer of the present invention is shown in FIGS. 17–26 and identified by the numeral 3.11. The sprayer 3.11 preferably is adapted to be detachably mounted on the side of an existing vehicle such as a farm tractor partially shown as at T in FIG. 18.

Figure 17:
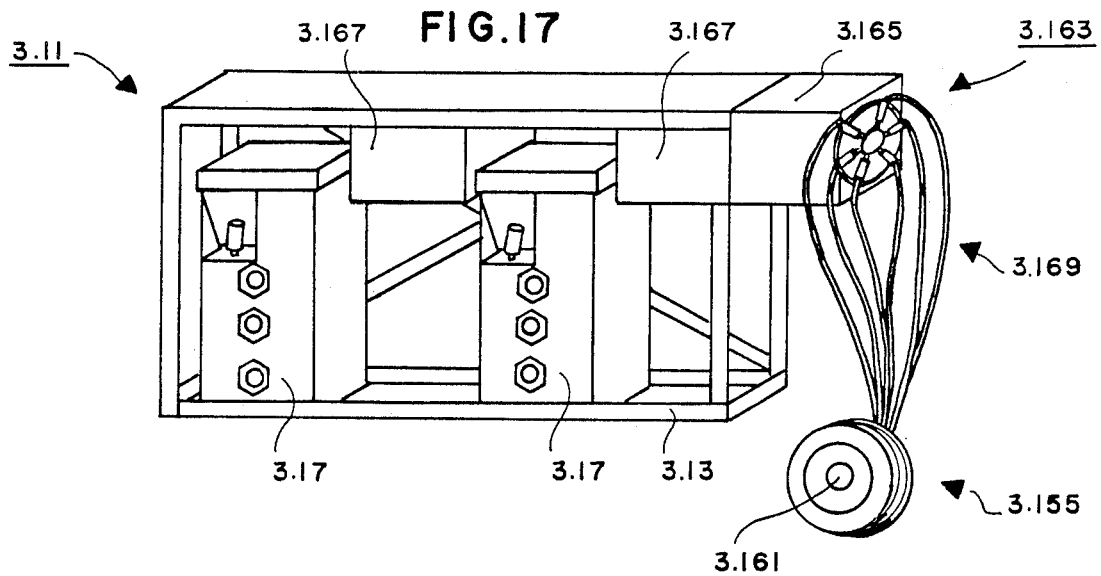
FIG. 17 is a perspective view of a third embodiment of the sprayer of the present invention.

Sprayer 3.11 includes a frame 3.13 formed of suitable open frame construction well known to those skilled in the art and preferably as shown in FIG. 17. Frame 3.13 is removably attached to the side of tractor T by suitable means as brackets 3.15.

Sprayer 3.11 includes one or more cartridges 3.17 which are basically the same as cartridges 2.39, 2.41, 2.43 and similar parts have corresponding numbers except that the numbers begin with the number "3" instead of "2". Thus, cartridge 3.17 comprises a box-like hollow body member 3.71 open at the upper end thereof. A partition 3.73 in body member 3.71 divides the body member 3.71 into the lower closed tank 3.44 for holding a quantity of a liquid chemical to be dispensed and an upper open-ended upper compartment 3.75. A removable top 3.77 is mounted on the open end 3.79 of the upper compartment 3.75 for the closing thereof and for providing access to the interior of the upper compartment 3.75.

Cartridge 3.17 includes pump means 3.45 which is preferably constructed and operates in a manner similar to pump means 2.45 and pump means 45. Thus, pump means 3.45 comprises a double acting plunger pump 3.81 located in closed tank 3.44 and includes piston means 3.83 extending upward through an aperture in partition 3.73 into the upper compartment 3.75. The pump means 3.45 includes pump actuating means 3.87, preferably similar to pump actuating means 2.87 and comprising a connecting arm portion, not shown, but like connecting arm portion 2.89, operatively connected to piston means 3.83, a chemical pump drive shaft 3.91, and an adjustment means 3.93 coupling chemical drive shaft 3.91 to the connecting arm portion for selectively varying the output of chemical pump means 3.45. Adjustment means 3.93 is preferably substantially similar to adjustment means 109 and reference should be made thereto for a more detailed description thereof as to its construction and operation. Suitable support means such as supports 3.94, well known to those skilled in the art, are provided for the support of drive shaft 3.91. It will be understood that when chemical pump drive shaft 3.91 is rotated it will cause actuation of pump 3.81 and that the output of pump 3.81 may be varied by means of adjustment means 3.93.

A first coupler half 3.95 of a quick disconnect coupler similar to coupler 2.97 is fixedly mounted on chemical pump drive shaft 3.91 and accessible from the outside of hollow body member 3.71 for the rotation of chemical pump drive shaft 3.91.

Cartridge 3.17 also includes calibration means 3.101 (see FIG. 20) for determining the output of pump 3.81 relative to a predetermined number of revolutions of chemical pump drive shaft 3.91. Calibration means 3.101 includes, in general, a hollow transparent calibration cylinder 3.103 having suitable calibration marks 3.104 thereon and includes a valve 3.105 which is positioned differently in cartridge 3.17 than in cartridge 2.39. Thus, in cartridge 3.17 valve 3.105 is positioned in the interior of calibration cylinder 3.103 along the longitudinal center line thereof (see FIGS. 21 and 22). Valve 3.105 is preferably a two position spool valve movable by a handle 3.107 between a first position shown in FIG. 21 and a second position shown in FIG. 22. The underside of handle 3.107 acts as a stop for the valve 3.105 when the valve is in said second position and a stop 3.108 stops the valve in said first position. Calibration means 3.101 also includes suitable conduit means which comprises a vent 3.109 communicating the upper interior of calibration cylinder 3.103 with the interior of tank 3.44, conduits 3.111 communicating the lower interior of calibration cylinder 3.103 with valve 3.105, conduits 3.113 communicating valve 3.105 with the interior of tank 3.44, a conduit 3.115 communicating the output of pump 3.81 with valve 3.105, and a conduit 3.117 communicating valve 3.105 with a quick disconnect fitting 3.119 substantially similar to fitting 2.119, which is adapted to removably receive a corresponding fitting, not shown, substantially similar to fitting 2.121. Although such corresponding fitting, the conduit connected therewith, water tank, manifolds, spray nozzles, conduits, valves, etc. for applying the chemicals to the field are not shown relative to the sprayer 3.11, it will be understood that these parts preferably are substantially similar to those shown and described relative to sprayer 2.11 and reference should be made to the description of sprayer 2.11 for the construction and operation of the corresponding parts of sprayer 3.11. Also, a quick disconnect dry coupling fitting 3.125, similar in construction and operation to fitting 2.125, is mounted on cartridge body member 3.71 and is in communication with the interior of tank 3.44 whereby the tank may be filled with liquid chemicals without having to open the tank.

The differences between the cartridge 3.17 and cartridge 2.39 (and therefore cartridges 2.41 and 2.43) are described hereinafter.

In cartridge 3.17, the body member 3.71 is provided with an inset portion 3.127 bounded in the back thereof by a sloping wall 3.129, by a portion of partition 3.73 on the bottom thereof, and by side walls 3.131, 3.133. Inset portion 3.127 is provided with an opening 3.135 at the front part thereof. Fitting 3.125 is mounted in inset portion 3.127 as best seen in FIGS. 19 and 20, with the fitting not extending outwardly beyond opening 3.135 yet being accessible from the outside of cartridge 3.17 so that the tank 3.44 may be filled with the use of a quick disconnect fitting, not shown, that mates with fitting half 3.125.

Another difference between cartridges 2.39 and 3.17 is that fitting 3.119 is mounted on the top side of sloping wall 3.129 in the interior of upper compartment 3.75. Access to connect the other half of the fitting to the fitting half 3.119 may be gained by removing top 3.77 or by providing an aperture, not shown, in top 3.77 which can also be used for extending the conduit therefrom to the other parts of the sprayer 3.11 for the spraying of the chemicals on the field, as is more fully described relative to sprayer 2.11. The purpose in having the fittings 3.119 and 3.125 within the boundaries of body member 3.71 is so that with this construction the cartridges 3.17 are adapted to be detached from frame 3.13 and used for transporting the various chemicals without having any interference from the fittings projecting from the body member 3.71. Thus, there is no danger of the fittings being knocked off, and the cartridges may be stacked more readily and arranged to take up less space during transportation.

Figure 19:
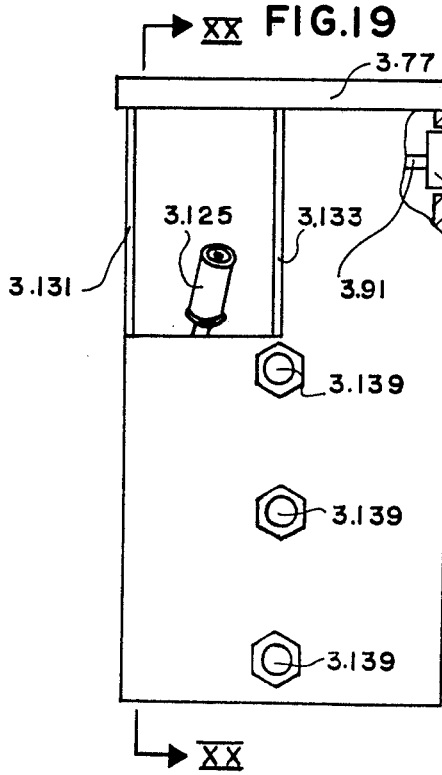
FIG. 19 is an enlarged front elevational view of one of the cartridges of the embodiment of FIG. 17 with a portion thereof broken away for the purposes of illustration.
Figure 20:
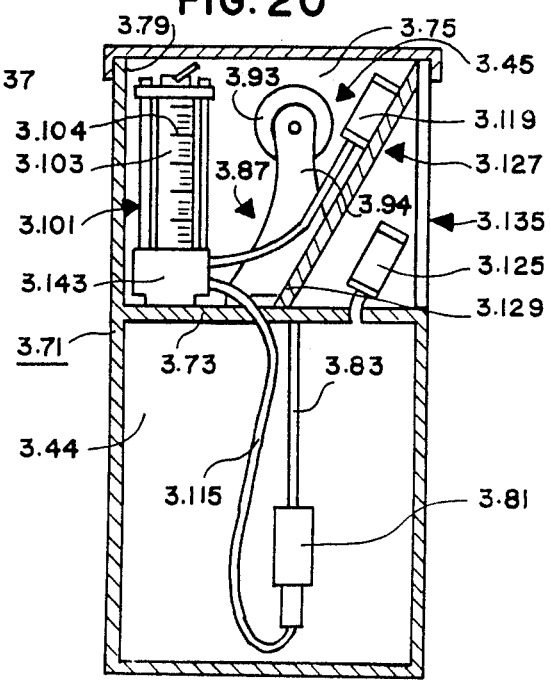
FIG. 20 is a sectional view substantially as taken on the line XX—XX of FIG. 19.
Figure 21:
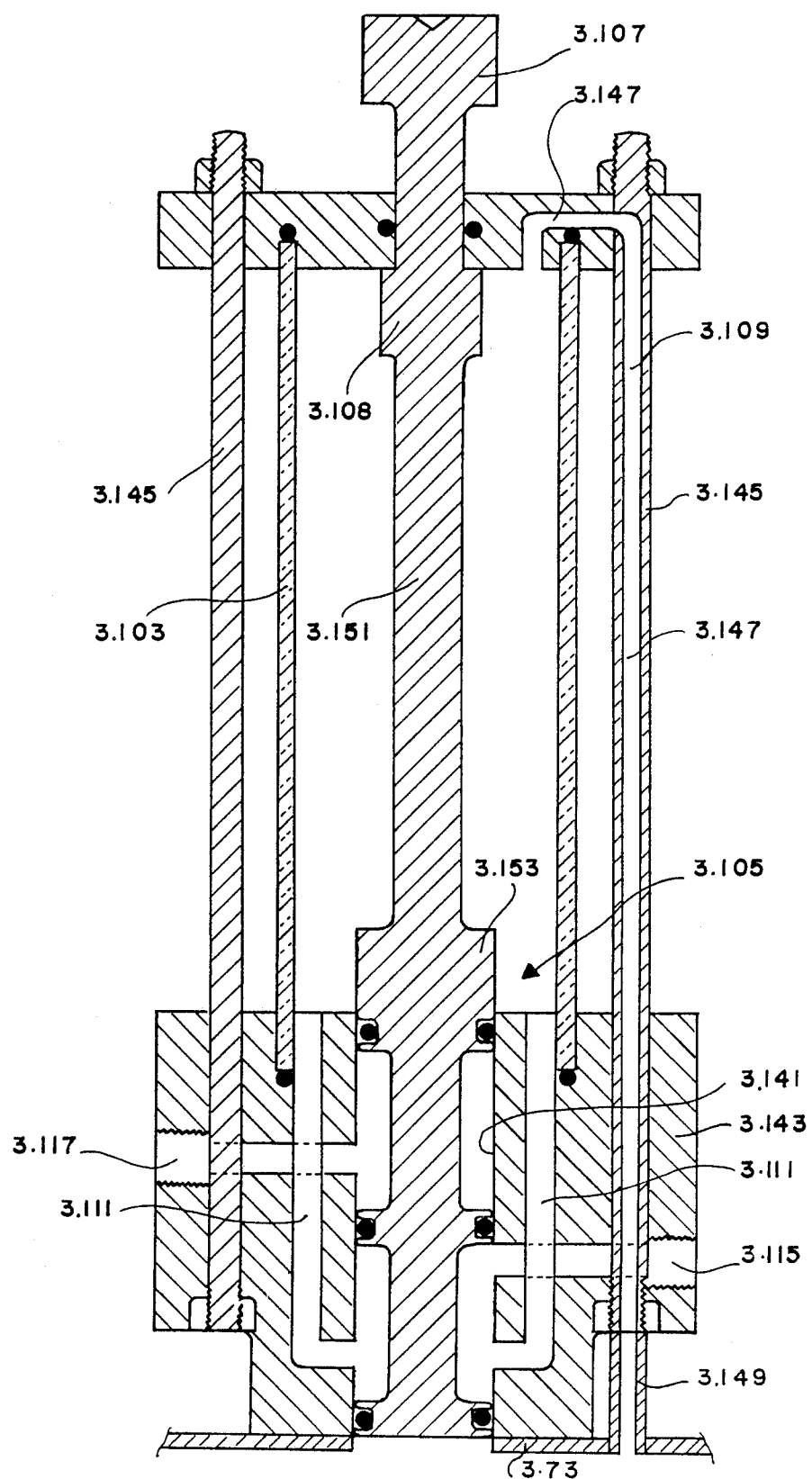
FIG. 21 is an enlarged sectional view of the calibration means of the sprayer of FIG. 17 with parts removed for purposes of clarity and showing the valve thereof in a calibrating position.
Figure 22:
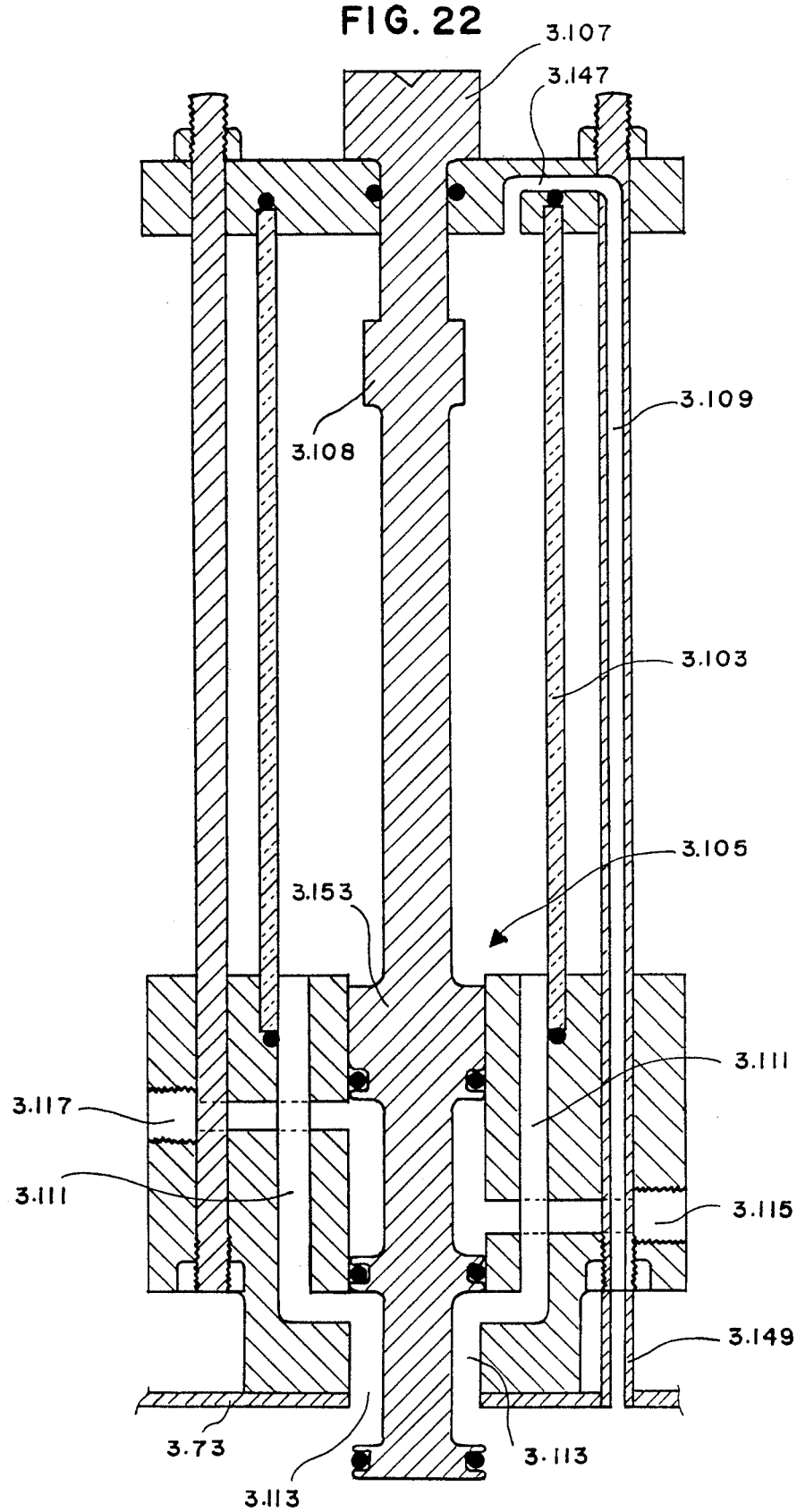
FIG. 22 is a view similar to FIG. 21 showing the valve in a normal non-calibrating position.

Still another difference between cartridges 2.39 and 3.17 is in the positioning of first coupler half 3.95 substantially within the boundaries of body member 3.71 as shown in FIG. 19 wherein it will be seen coupler half 3.95 extends partially through an opening 3.137 in the wall of body member 3.71 so that the coupler half 3.95 is accessible from the outside of body member 3.71 and yet does not interfere with transporting the cartridge, etc.

Additional differences between cartridges 2.39 and 3.17 include the calibration means 3.101 which has been briefly mentioned and the transparent sight glasses 3.139 provided in the wall of tank 3.44 so that the level of the liquid chemicals in the tank may be observed. The sight glasses 3.139 are preferably spaced so that one is adjacent the upper part of the tank 3.44, one adjacent the middle, and one adjacent the bottom of the tank 3.44.

More specifically relative to calibration means 3.101, the portions of the conduits 3.111, 3.113, 3.115, 3.117 in calibration means 3.101 and the bore 3.141 of the valve 3.105 are provided in the base 3.143 of calibration means 3.101. The vent 3.109 is preferably formed by providing one of the tie rods 3.145 of the calibration means with a hollow center which is in communication with the upper interior of cylinder 3.103 through a bored out portion 3.147 and the lower end of the hollow tie rod 3.145 is in communication with tank 3.44 through a conduit 3.149 which extends through an aperture in partition 3.73. The handle 3.107 and stop 3.108 of valve 3.105 are provided on a rod 3.151 that extends from handle 3.107 to the lower, spool portion 3.153 of the valve.

Calibration means 3.101 operates in a manner similar to calibration means 2.101. Thus, when valve 3.105 is in said first position (see FIG. 21), conduit 3.115 is in communication with conduits 3.111 whereby the output of pump 3.81 is in communication with the interior of cylinder 3.103 so that by rotating shaft 3 91 manually by hand or by other means, not shown, and by setting the adjustment means 3.93 the operator can calibrate the cartridge 3.17 as heretofore more fully described relative to calibration means 2.101. Then, when valve 3.105 is in said second position (see FIG. 22), conduit 3.115 is in communication with conduit 3.117 whereby the output of pump 3.81 is available at fitting 3.119 so that when joined with the remaining system of sprayer 3.11 it will be ready for spraying the chemicals on the field as needed.

One or more of the cartridges 3.17, as desired, are removably mounted on frame 3.13. The same type detachable mounting means as used for cartridges 2.39, 2.41, 2.43 are preferably provided to selectively hold cartridges 3.17 in place.

Figure 18:
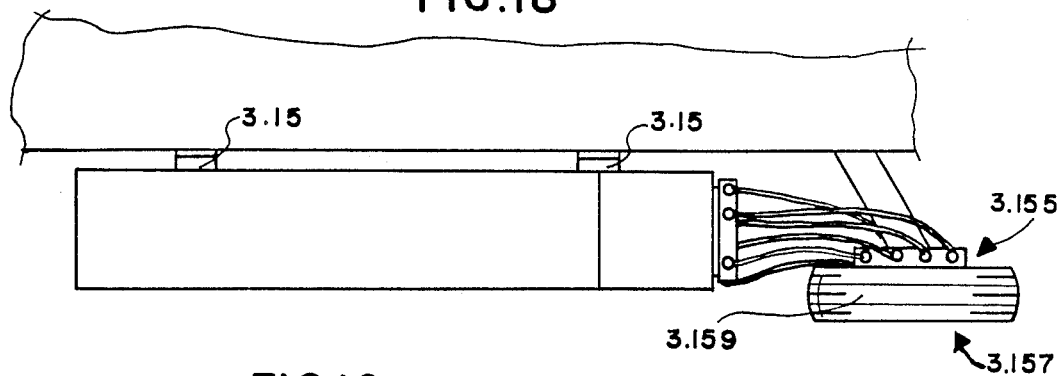
FIG. 18 is a top plan view of the sprayer of FIG. 17 shown mounted on a vehicle.

Sprayer 3.11 includes sensing means 3.155 for sensing the speed at which the sprayer is moving over the field (see FIGS. 17 and 18). The sensing means 3.155 preferably includes ground-engaging wheel means 3.157 for engaging the ground as the sprayer 3.11 is moved over the field. The ground-engaging wheel means 3.157 preferably includes a ground-engaging wheel 3.159 for being rotated by the ground as the sprayer 3.11 is moved over the field and includes a ground-engaging wheel shaft 3.161 upon which the wheel 3.159 is rotatably mounted. As the sprayer 3.11 is moved over the field, the ground-engaging wheel 3.159 rotates at a speed proportional to the speed at which the sprayer 3.11 is being moved over the field.

Overall drive means 3.163 is operatively coupled to sensing means 3.155 and to cartridges 3.17 for varying the output of the cartridges in proportion to the speed at which sprayer 3.11 is moved over the field. In addition, each individual cartridge 3.17 may be set to a specific output of chemicals depending upon the desired application at any given time of the chemicals onto the field, as will now be understood by those skilled in the art.

Overall drive means 3.163 includes a main gear box 3.165 mounted on frame 3.13 and a plurality of intermediate gear boxes 3.167 movably mounted on frame 3.163. There is preferably one gear box 3.167 for each cartridge 3.17.

Intermediate gear boxes 3.167, main gear box 3.165, and the connections therebetween are constructed and operate in the same manner as intermediate gear boxes 2.145, main gear box 2.143 and the connections therebetween, and for a detailed description thereof reference should be made to sprayer 2.11.

One of the main differences between sprayer 3.11 and sprayer 2.11 is that the overall drive means 3.163 of sprayer 3.11 includes hydraulic drive means 3.169 operatively coupled between ground-engaging wheel means 3.157 and the input shaft 3.171 of main gear box 3.165.

Figure 23:
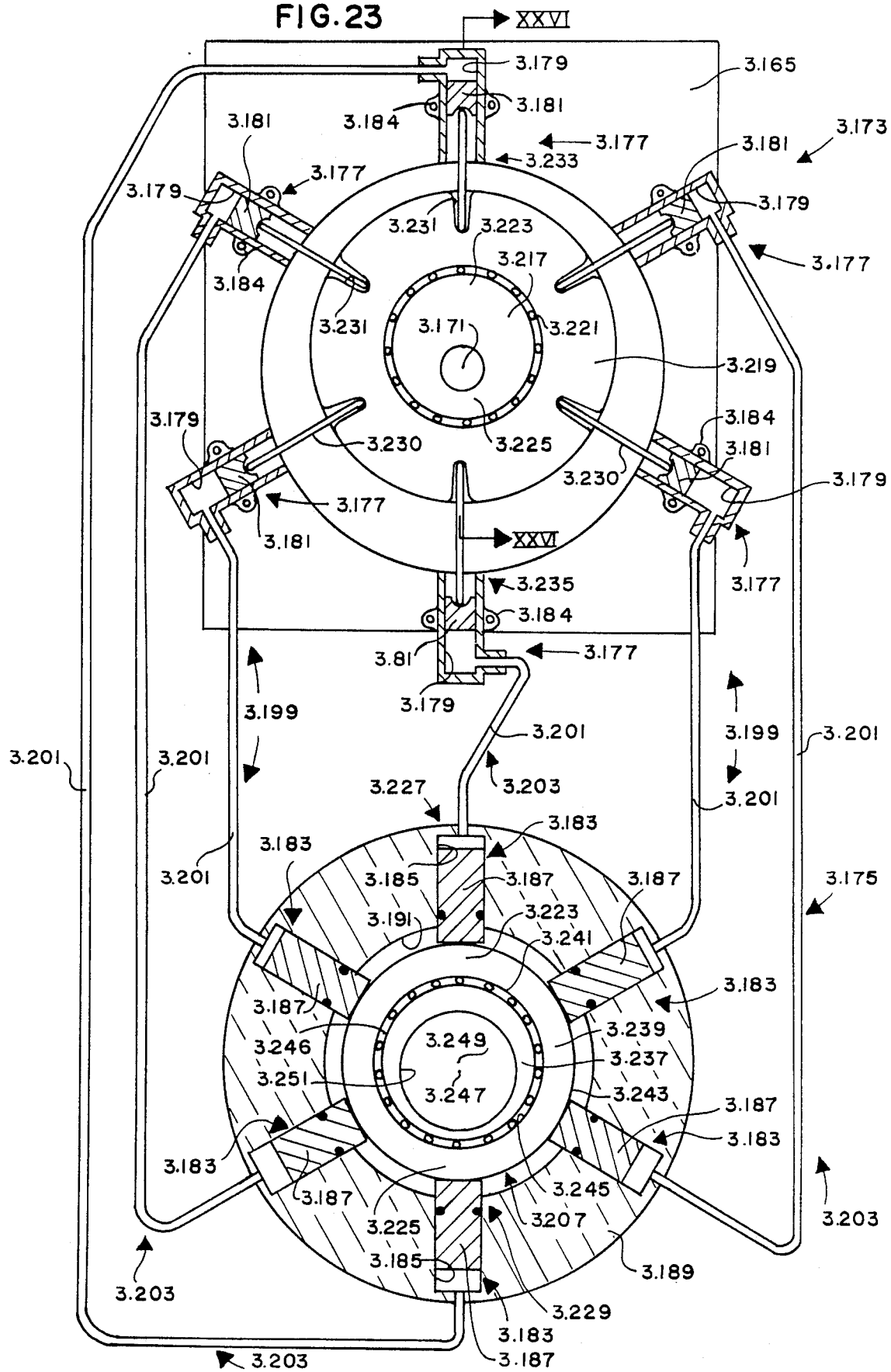
FIG. 23 is a somewhat schematic view of the hydraulic drive means of the sprayer of FIG. 17.
Figure 24:
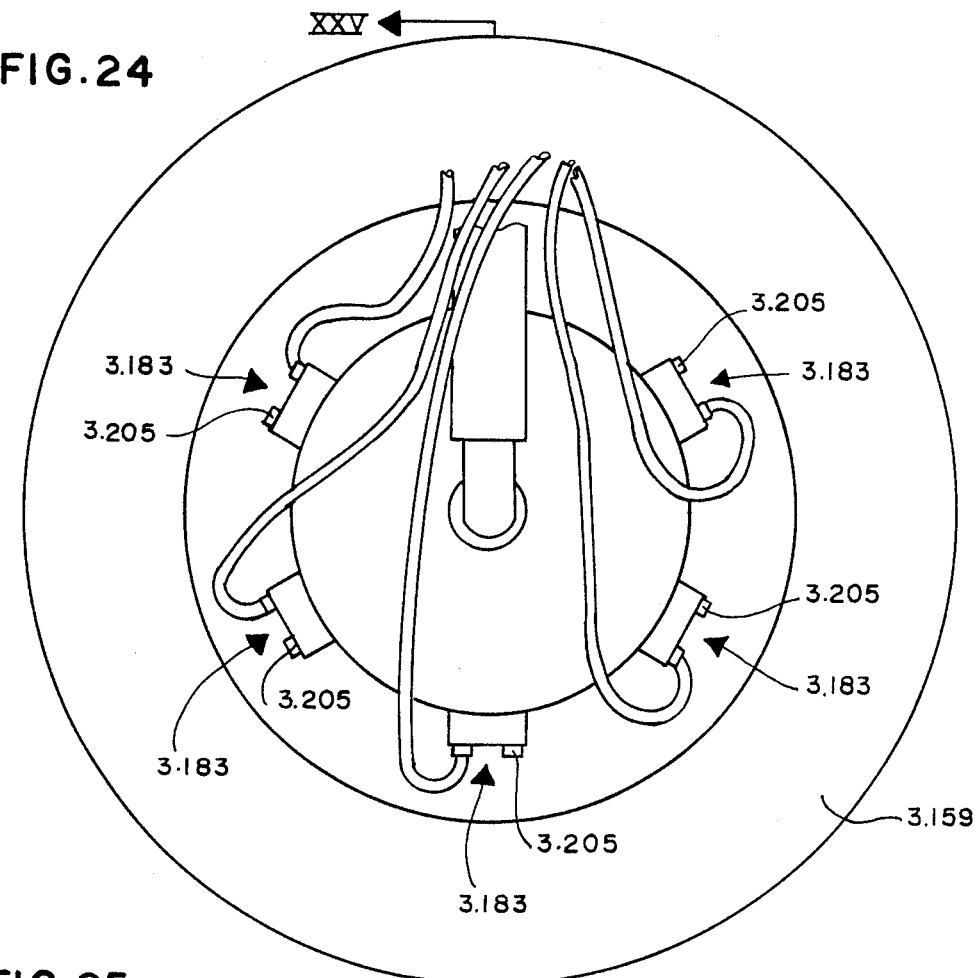
FIG. 24 is a side elevational view of the master drive means of the sprayer of FIG. 17.
Figure 25:
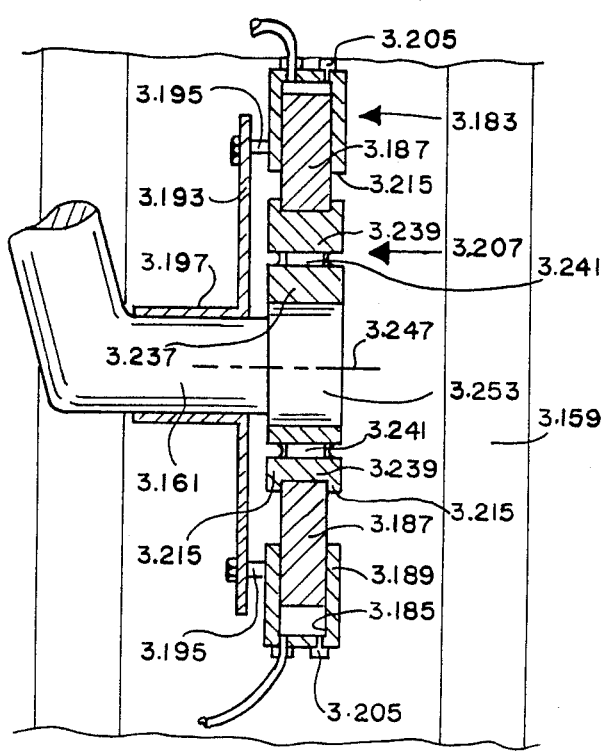
FIG. 25 is a sectional view substantially as taken on the line XXV—XXV of FIG. 24.
Figure 26:
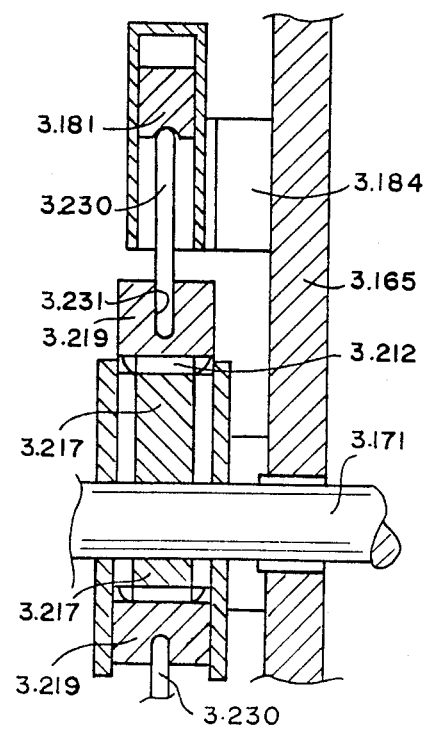
FIG. 26 is a fragmentary sectional view substantially as taken on the line XXVI—XXVI of FIG. 23.

Hydraulic drive means 3.169 includes slave drive means 3.173 operatively coupled to input shaft 3.171 for the rotation thereof and includes master drive means 3.175 operatively coupled to ground engaging wheel means 3.157 and slave drive means 3.173 for rotation of input shaft 3.171 in proportion to the rotation of wheel 3.159 (see, in general, FIG. 23).

Slave drive means 3.173 includes a plurality of slave piston means 3.177, and each of the slave piston means 3.177 includes a slave cylinder 3.179 and a slave piston 3.181 movably mounted therein. Master drive means 3.175 includes a like plurality of master piston means 3.183. There are preferably six of the master piston means 3.183 equally spaced in circular arrangement at sixty degree intervals and likewise there are preferably six of the slave piston means 3.177 similarly arranged. The slave piston means 3.177 are supported from the outside of main gear box 3.165 by suitable means, well known to those skilled in the art, such as brackets 3.184. Each of the master piston means 3.183 includes a master cylinder 3.185 and a master piston 3.187 movably mounted therein. Cylinders 3.185 are preferably formed in an annular member 3.189 having an inner circular surface 3.191. Annular member 3.189 is fixedly mounted from a disc member 3.193, or other suitable supporting structure well known to those skilled in the art, by suitable means as bolts 3.195. Disc member 3.193 is, in turn, fixedly mounted on the non-rotatable wheel shaft 3.161 by suitable means known to those skilled in the art, as by the cylindrical portion 3.197 which is formed integral with disc member 3.193 and fixed to shaft 3.161 by suitable means well known to those skilled in the art. Slave piston means 3.177 are respectively paired with master piston means 3.183 to establish a like plurality of paired piston means 3.199 (see FIG. 23). Thus, there are preferably six paired piston means 3.199 with each including one of the slave piston means 3.177 and one of the master piston means 3.183. Conduit means 3.201 respectively communicate the cylinders 3.179, 3.185 of paired piston means 3.199 with one another to establish a like plurality of closed fluid systems 3.203. Hydraulic oil is received in the closed fluid systems 3.203, and suitable bleed means, such as bleed valves 3.205, are provided, respectively in communication with the interior of cylinders 3.185 and the outside atmosphere to bleed the air from each of the systems 3.203, as needed.

Slave pistons 3.181 and master pistons 3.187 are respectively movable in cylinders 3.179 and 3.185 between extended and retracted positions. Movement of each of pistons 3.181, 3.187 from said retracted position to said extended position is effective to displace a predetermined amount of hydraulic oil. The displacement of hydraulic oil in one of the cylinders 3.179, 3.185 of each of the paired piston means 3.199 is substantially the same as the displacement of hydraulic oil in the cylinder 3.179, 3.185 of the other of said each of the paired piston means 3.199.

Wheel cam means 3.207 is mounted on wheel 3.159 for actuation upon rotation of wheel 3.159. Master pistons 3.187 are arranged around wheel cams means 3.207 at sixty degree intervals respectively along radii of wheel 3.159 and are in operable contact with the wheel cam means to cause the master pistons 3.187 respectively to move from said retracted positions to said extended positions. There are lips 3.215 on the inner side edges of wheel cam means 3.207 to restrict lateral movement of master pistons 3.187.

Slave drive means 3.173 includes an inner slave cam means 3.217 fixedly mounted on input shaft 3.171 for causing rotation of input shaft 3.171 with the rotation of inner slave cam means 3.217, an outer slave cam means 3.219, and slave bearing means 3.221 between inner slave cam means 3.217 and outer slave cam means 3.219 for permitting rotation of inner slave cam means 3.217 relative to outer slave cam means 3.219.

Wheel cam means 3.207 and inner slave cam means 3.217 each includes a major cam portion 3.223 and a minor cam portion 3.225. A first changing group 3.227 of master piston means 3.183 occurs during the operation of master drive means 3.175 and is defined as those master piston means 3.183 which are adjacent major cam portion 3.223 at any particular time as the wheel cam means 3.207 is actuated. Also a second changing group 3.229 of master pistons means 3.183 occurs during the operation of master drive means 3.175 and is defined as those master piston means 3.183 which are adjacent minor cam portion 3.225 at any particular time as the wheel cam means 3.207 is actuated.

Coupling means, which preferably comprises rods 3.230 respectively pivotally attached to slave pistons 3.181 and extending into slots 3.231 in the outer edge of outer slave cam means 3.219, couples slave pistons 3.181 with outer slave cam means 3.219 for causing rotation of the inner slave cam means 3.217 as the slave pistons 3.181 move toward extended positions. The slots 3.231 are preferably V-shaped as seen in FIG. 23, so as to allow some relative movement of the rods 3.230 and outer slave cam means 3.219.

A first changing group 3.233 of slave piston means 3.177 occurs during the operation of slave drive means 3.173 and is defined as those slave piston means 3.177 which are adjacent major cam portion 3.223 of inner slave cam means 3.217 at and particular time as inner slave cam means 3.217 rotates. A second changing group 3.235 of slave piston means 3.177 occurs during the operation of slave drive means 3.173 and is defined as those slave piston means 3.177 which are adjacent minor cam portion 3.225 of inner slave cam means 3.217 as the inner slave cam means 3.217 rotates. The major cam portions 3.223 and the minor cam portions 3.225 of wheel cam means 3.207 and inner slave cam means 3.217 are 180 degrees out of phase with one another with respect to the paired piston means 3.199, that is, when a slave piston means 3.177 is adjacent a major cam portion 3.223, the master piston means 3.183 of that pair is adjacent a minor cam portion 3.225, and when a slave piston means 3.177 is adjacent a minor cam portion 3.225, the master piston means 3.183 of that pair is adjacent a major cam portion 3.223.

The master cylinders 3.185 of first changing group 3.227 of the master piston means 3.183 are in communication with the slave cylinders 3.179 of second changing group 3.235 of the slave piston means 3.177, and the master cylinders 3.185 of the second changing group 3.229 of the master piston means 3.183 are in communication with the slave cylinders 3.179 of the first changing group 3.233 of the slave piston means 3.177 whereby as wheel 3.159 rotates and wheel cam means 3.207 is actuated, the first changing group 3.227 of master piston means 3.183 causes a portion of the hydraulic oil to flow from the first changing group 3.227 of master piston means 3.183 to the second changing group 3.235 of slave piston means 3.177 whereby to rotate inner slave cam means 3.217 and the input shaft 3.171. The rotation of inner slave cam means 3.217 actuates the outer slave cam means 3.219 and slava piston means 3.177 to cause a portion of the hydraulic oil to flow from the first changing group 3.233 of the slave piston means 3.177 and return to the second changing group 3.229 of the master piston means 3.183 to cause the master pistons 3.187 of the second changing group 3.229 of the master piston means 3.183 to he urged towards the wheel cam means 3.207.

Wheel cam means 3.207 includes an inner master cam portion 3.237, an outer master cam portion 3.239, and a master bearing ring 3.241 disposed between the cam portions 3.237 and 3.239. The outer cam surface 3.243 of outer master cam portion 3.239, the inner surface 3.245 of outer master cam portion 3.239, the outer surface 3.246 of inner master cam portion 3.237, and the master bearing ring 3.241 are circular, and are concentric with respect to one another but are eccentric relative to the axis 3.247 about which wheel 3.159 rotates. Thus, the centers (shown as at 3.249 in FIG. 23) of outer cam surface 3.243, inner surface 3.245 outer surface 3.246, and master bearing ring 3.241 are coincident with one another and are spaced from axis 3.247. Inner master cam portion 3.237 is preferably circular on the inner surface 3.251 thereof with the surface 3.251 being eccentric relative to the outer cam surface 3.243 but concentric with respect to wheel 3.159. Inner master cam portion 3.237 is fixedly attached to wheel 3.159 for rotation therewith by suitable means well known to those skilled in the art, as for example, by being attached as by welding or the like to a hub portion 3.253 of wheel 3.159 which rotates about the wheel shaft 3.161. From the foregoing it will be understood by those skilled in the art that as wheel 3.159 and inner master cam portion 3.237 rotate the major cam portion 3.223 and the minor cam portion 3.225 effectively move successively around in a circle in contact with the successive master pistons 3.187.

In the operation of the sprayer 3.11, it will be understood that the sprayer may be attached to a suitable tractor by means heretofore described. In doing so one of the existing wheels of the tractor may be replaced by wheel means 3.157. Before spraying the field each of the cartridges 3.17 are preferably calibrated for the particular chemical in the tank 3.44, as heretofore described, and the conduits are hooked up to the spray manifolds and water tank, which may be provided as heretofore described relative to sprayer 2.11, or suitable spray equipment may be provided on the tractor, well known to those skilled in the art, to which sprayer 3.11 may be attached. Also, suitable electrical circuits, well known to those skilled in the art, may be provided for actuating the electromagnetic clutch means in the main gear box 3.165 and intermediate gear boxes 3.167 whereby the operator has a great amount of flexibility and can very effectively accomplish prescription weed and pest control.

Figure 27:
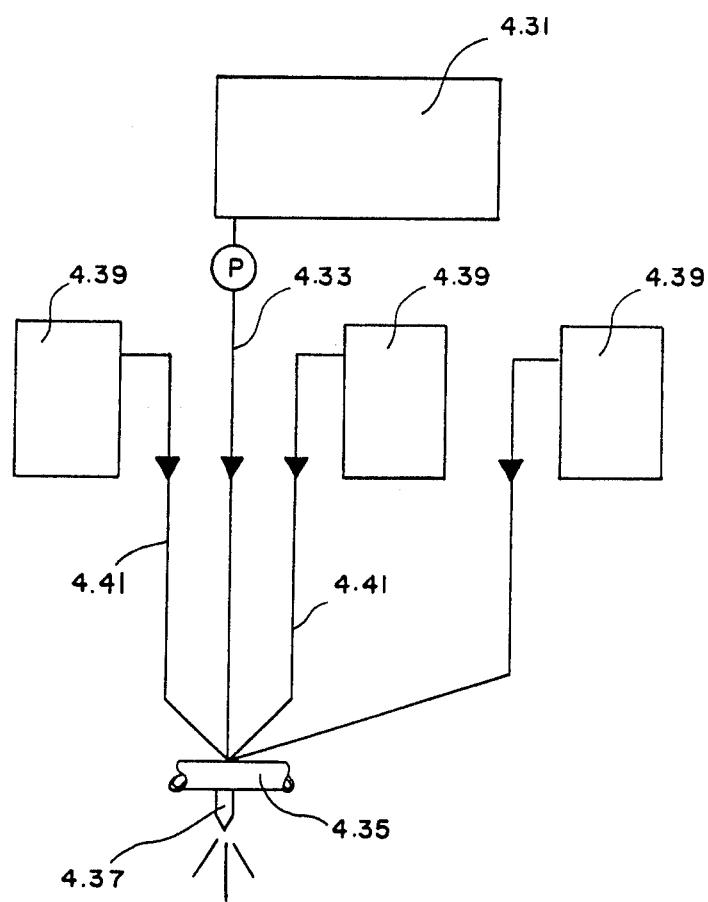
FIG. 27 is a diagrammatic view of an alternative manner of feeding the liquid to the nozzles in the sprayer of the present invention.

FIG. 27 shows an alternative manner in which the chemical and water may be distributed to the nozzles in any of the previous embodiments. Instead of feeding the water and the chemicals to the manifold where the liquids are mixed and the mixture flows to the nozzles as in the previous embodiments, in the embodiment shown in FIG. 27 the water from the water tank 4.31 which flows through the conduit 4.33 is fed into the manifold 4.35 directly behind a nozzle 4.37. Similarly, the chemicals from the tanks or cartridges 4.39 which flow through the conduits 4.41 are fed into the manifold 4.35 directly behind a nozzle 4.37. Thus, the portion of the system in which the liquids are mixed is only at the nozzles thereby further minimizing the portion of the system that is contaminated with the chemical mixture so that the amount of flushing needed when chemicals are changed is reduced to a minimum. It will be understood that the system shown in FIG. 27 may be utilized to feed the liquids to one or more or all of the nozzles in and given system of the previous embodiments of the sprayers of the present invention heretofore disclosed.

Although the present invention has been described and illustrated with respect to a preferred embodiment thereof and a preferred use therefor, it is not to be so limited since changes and modifications can be made therein which are within the full intended scope of the invention.

I claim:

1. A direct injection chemical sprayer for spraying a fluid mixture onto a field as said sprayer is moved over the field comprising:
    (a) a frame;
    (b) an elongated manifold member having a plurality of spray nozzles mounted thereon;
    (c) a water tank holding a quantity of water to be sprayed;
    (d) a water pump means operatively coupled to said manifold member and said water tank for selectively pumping water from said water tank to said manifold member and out said spray nozzles of said manifold member;
    (e) a plurality of self-contained cartridge means removably mounted on said frame for holding a quantity of chemicals to be sprayed from said nozzles of said manifold member with the water and for selectively pumping chemicals in said cartridge means to said manifold member and out said spray nozzles of said manifold member with the water; said cartridge means including a closed tank for holding a quantity of chemicals;
    (f) attaching means for quickly attaching said cartridge means to said frame in a selected position and for quickly detaching said cartridge means from said frame;
    (g) means for quickly operatively connecting and disconnecting said tank to and from said manifold;
    (h) sensing means for sensing the speed at which said sprayer is moving over the field; and
    (i) overall drive means operatively coupled to said sensing means and to said cartridge means for varying the output of said cartridge means in proportion to the speed at which said sprayer is being moved over the field; said overall drive means including main gear box means mounted on said frame and a plurality of intermediate gear box means removably mounted on said frame; each of said main gear box means and said intermediate gear box means including an input shaft and an output shaft, connecting rod means for removably connecting the input shafts of said intermediate gear box means together for conjoint movement thereof, means removably coupling said output shaft of said main gear box means to said input shaft of one of said intermediate gear box means for conjoint movement of said output shaft of said main gear box means and said input shafts of said intermediate gear box means, means removably coupling said output shafts of said intermediate gear box means respectively to said chemical drive shafts of said cartridge means for the driving thereof; said overall drive means including main gear box drive means including a first main drive means for selectively driving said output shaft of said main gear box and said input shafts of said intermediate gear boxes at a first speed proportional to the speed at which said sprayer is being moved over the field and including a second main drive means for selectively driving said output shaft of said main gear box and said input shafts of said intermediate gear boxes at a second speed proportional to the speed at which said sprayer is being moved over the field.

2. The sprayer of claim 1 in which said main gear box drive means includes a third main drive means for selectively driving said output shaft of said main gear box and said input shafts of said intermediate gear boxes at a third speed proportional to the speed at which said sprayer is being moved over the field.

3. The sprayer of claim 2 in which said sensing means includes a ground-engaging wheel means for engaging the ground as said sprayer is moved over the field; said ground-engaging wheel means including a ground-engaging wheel shaft for being rotated as said sprayer is moved over the field at a speed proportional to the speed at which said sprayer is being moved over the field.

4. The sprayer of claim 3 in which said first main drive means of said main gear box drive means causes said output shaft of said main gear box and said input shafts of said intermediate gear boxes to rotate at a speed directly proportional to the speed at which said ground-engaging wheel shaft of said ground-engaging wheel means is rotating.

5. The sprayer of claim 4 in which said second main drive means of said main gear box drive means causes said output shaft of said main gear box and said input shafts of said intermediate gear boxes to rotate at a speed two-third proportional to the speed at which said ground-engaging wheel shaft of said ground-engaging wheel means is rotating.

6. The sprayer of claim 5 in which said third main drive means of said main gear box drive means causes said output shaft of said main gear box and said input shafts of said intermediate shafts to rotate at a speed one-third proportional to the speed at which said ground-engaging wheel shaft of said ground-engaging wheel means is rotating.

7. The sprayer of claim 6 in which each of said intermediate gear box drive means includes a first intermediate gear box drive means for selectively driving said output shaft thereof at a first speed proportional to the speed of said input shaft thereof and includes a second intermediate gear box drive means for selectively driving said output shaft thereof at a second speed proportional to the speed of said input shaft thereof.

8. The sprayer of claim 7 in which each said intermediate gear box drive means includes a third intermediate gear box drive means for selectively driving said output shaft thereof at a third speed proportional to the speed of said input shaft thereof.

9. The sprayer of claim 8 in which said first intermediate gear box drive means of said intermediate gear box drive means causes said output thereof to rotate at a speed directly proportional to the speed of said input shaft thereof.

10. The sprayer of claim 9 in which said second intermediate drive means of said intermediate gear box drive means causes said output shaft thereof to rotate at a speed two-thirds proportional to the speed of said input shaft thereof.

11. The sprayer of claim 10 in which said third intermediate drive means of said intermediate gear box drive means causes said output shaft thereof to rotate at a speed one-third proportional to the speed of said input shaft thereof.

12. The sprayer of claim 11 in which each of said drive means of said intermediate gear box drive means includes a first sprocket member attached to said input shaft of said intermediate gear box drive means for being rotated by said input shaft of said intermediate gear box drive means at a speed proportional to the speed of said input shaft of said intermediate gear box drive means, includes a second sprocket member meshing with said first sprocket member and attached to said output shaft of said intermediate gear box drive means for causing said output shaft of said intermediate gear box drive means to rotate when said first sprocket member rotates at a speed proportional to the speed at which said first sprocket member is rotating, and includes a clutch means for disengagably coupling one of said sprocket members to a respective one of said shafts.

* * * * *